ROTARY PUMP AND MOTOR HYDRAULIC TRANSMISSION
Original Filed June 10, 1952 9 Sheets-Sheet 1
FIG. 1-A.
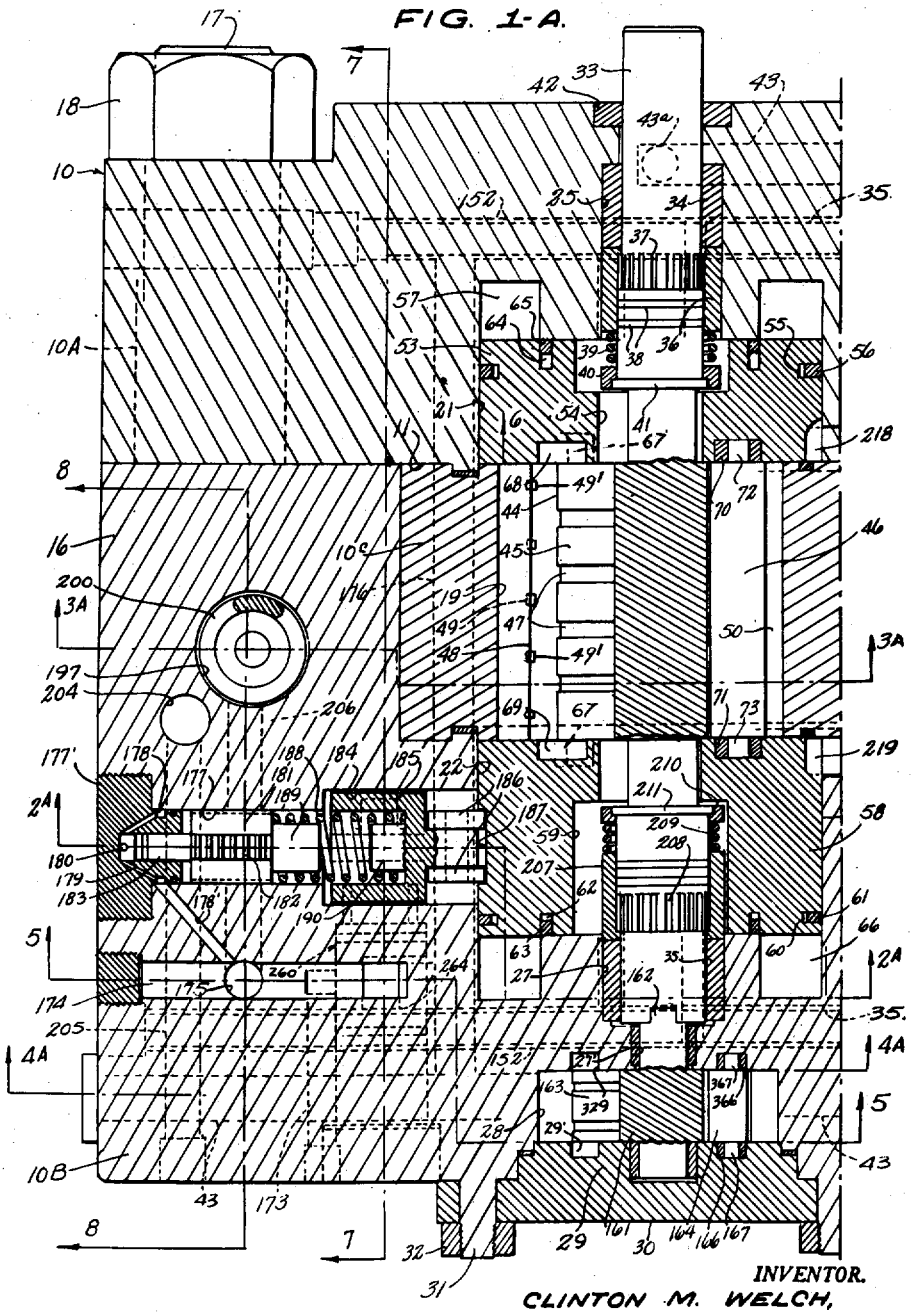
INVENTOR.
CLINTON M. WELCH,
BY
Whittemore, Hulbert & Belknap
ATTORNEYS.

ROTARY PUMP AND MOTOR HYDRAULIC TRANSMISSION
Original Filed June 10, 1952 9 Sheets-Sheet 2
FIG. 1-B.
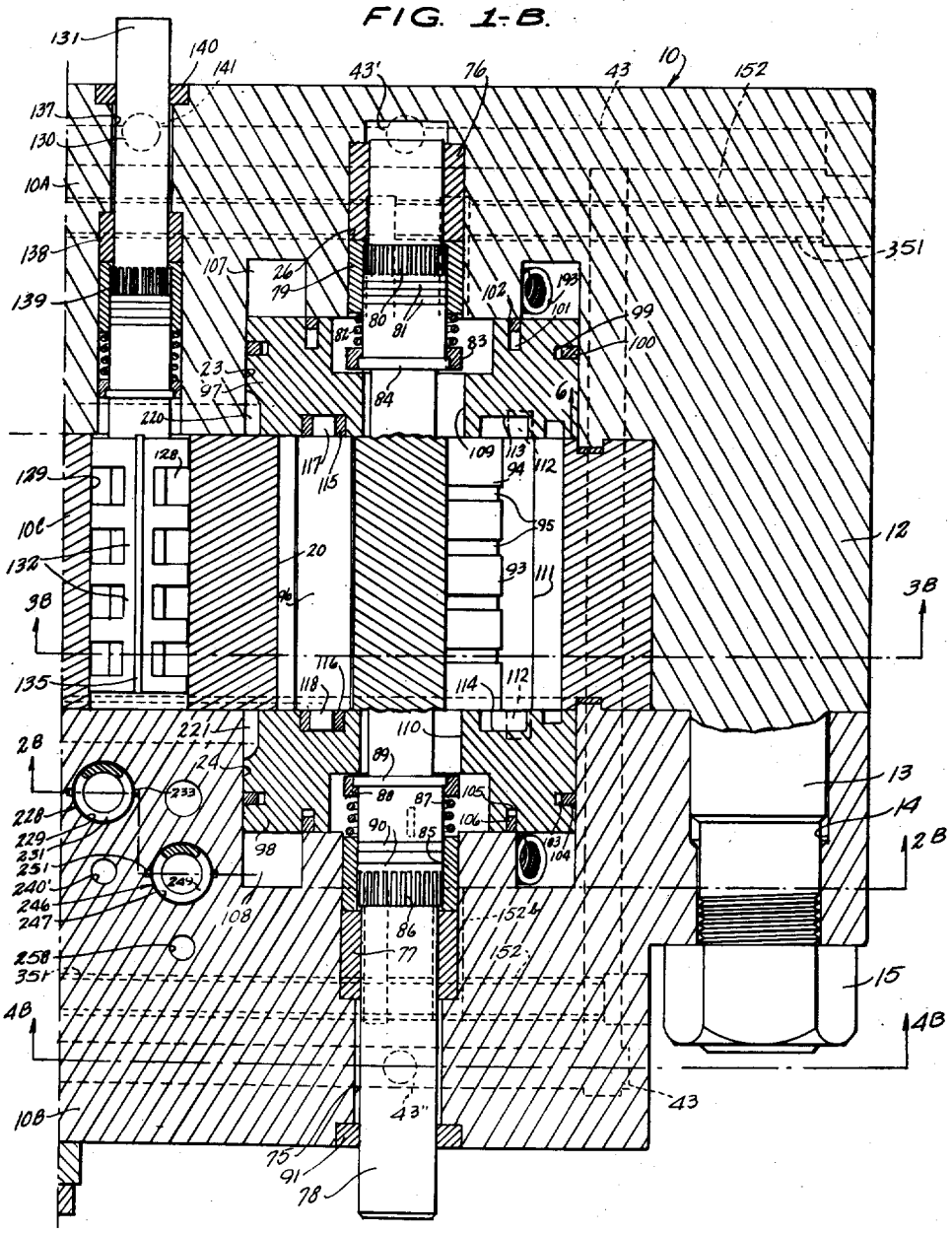
INVENTOR.
CLINTON M. WELCH,
BY
Whittemore, Hulbert & Belknap
ATTORNEYS.

ROTARY PUMP AND MOTOR HYDRAULIC TRANSMISSION
Original Filed June 10, 1952 9 Sheets-Sheet 3
FIG. 2-A.
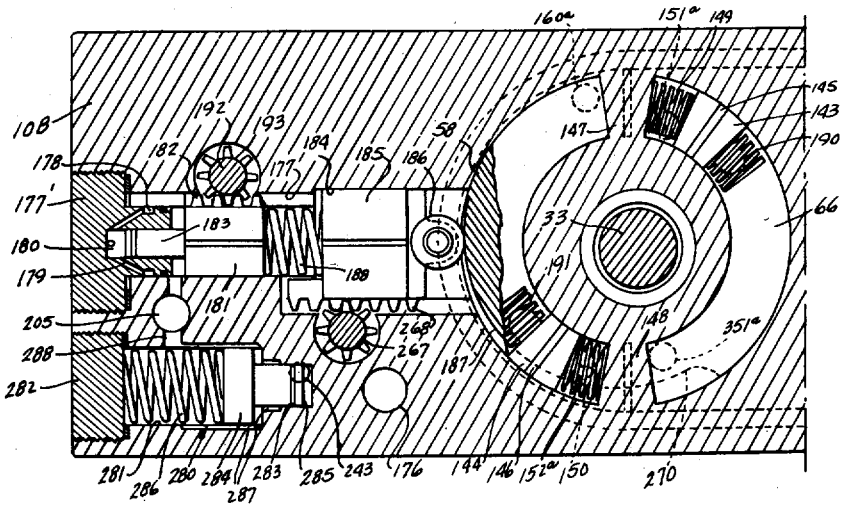
FIG. 3-A.
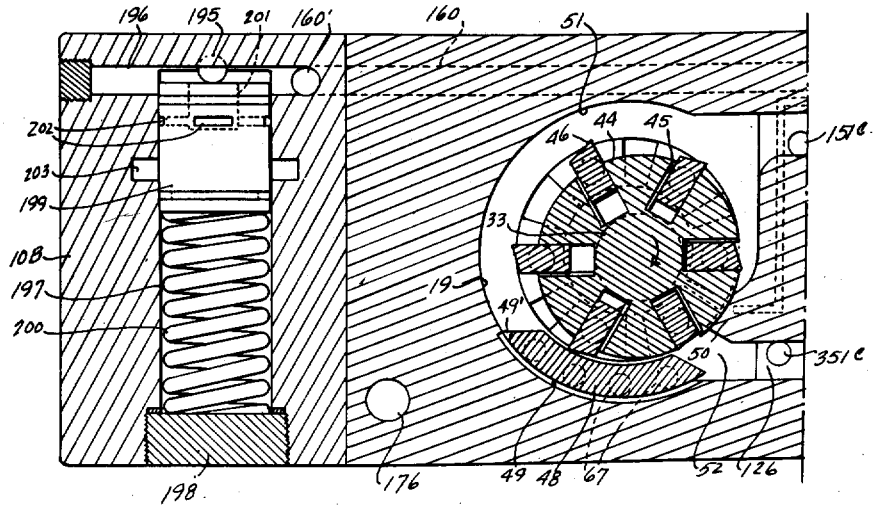
INVENTOR.
CLINTON M. WELCH,
BY
Whittemore, Hulbert & Belknap
ATTORNEYS ROTARY PUMP AND MOTOR HYDRAULIC TRANSMISSION
Original Filed June 10, 1952 9 Sheets-Sheet 4
FIG. 2-B.
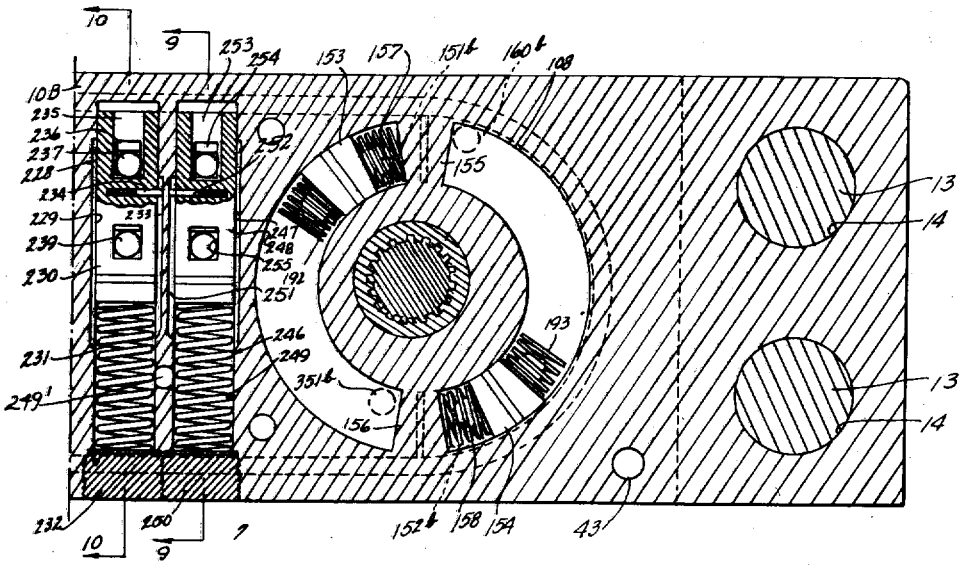
FIG. 3-B.
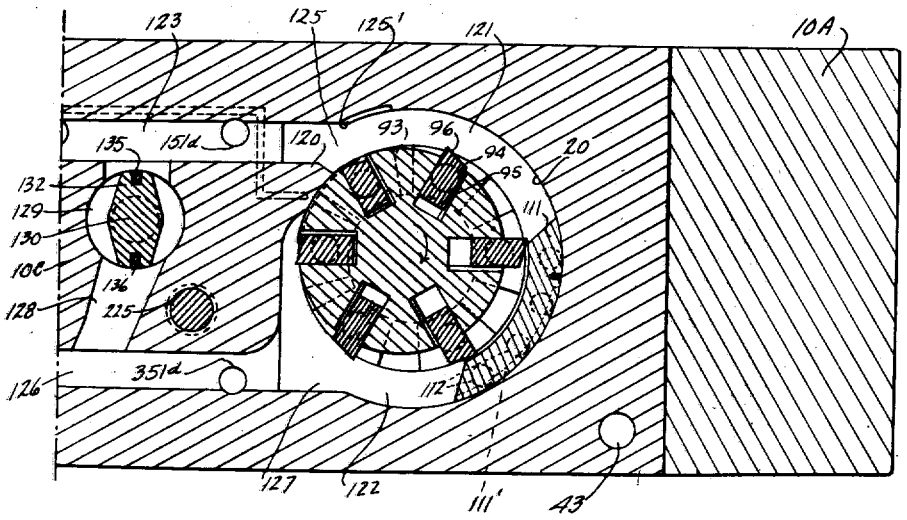
INVENTOR.
CLINTON M. WELCH,
BY
Whittemore, Hulbert & Belknap
ATTORNEYS.

ROTARY PUMP AND MOTOR HYDRAULIC TRANSMISSION
Original Filed June 10, 1952 9 Sheets-Sheet 5
FIG. 4-A.
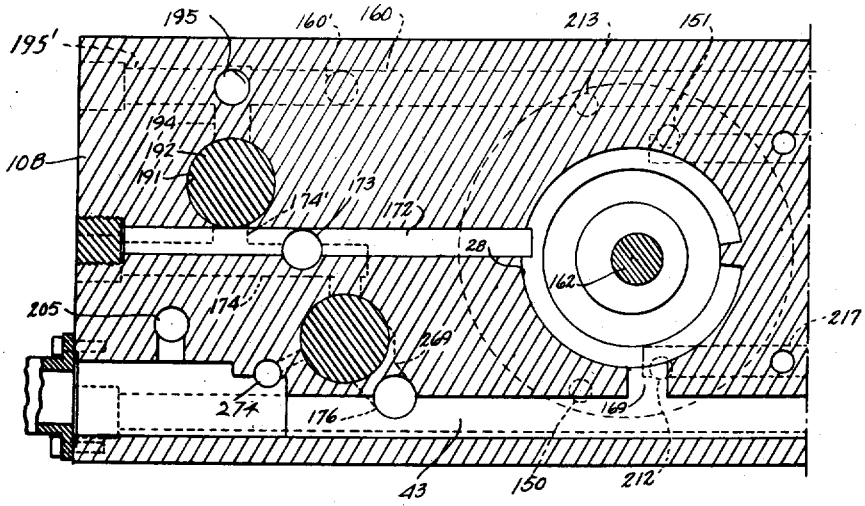
FIG. 4-B.
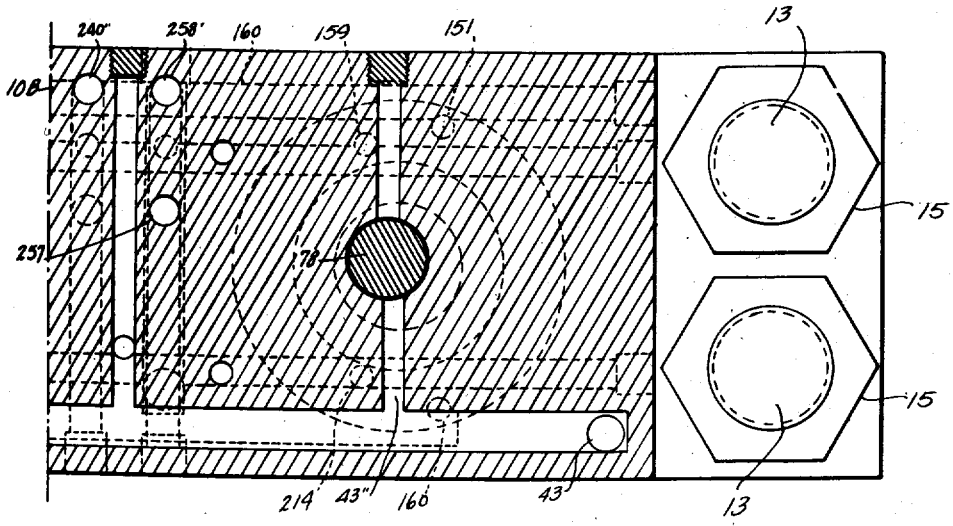
INVENTOR.
CLINTON M. WELCH
BY
Whittemore, Hulbert & Belknap
ATTORNEYS.

ROTARY PUMP AND MOTOR HYDRAULIC TRANSMISSION

Original Filed June 10, 1952 9 Sheets-Sheet 6

INVENTOR.
CLINTON M. WELCH,
BY
Whittemore, Hulbert & Belknap
ATTORNEYS

ROTARY PUMP AND MOTOR HYDRAULIC TRANSMISSION

Original Filed June 10, 1952 9 Sheets-Sheet 7

INVENTOR.
CLINTON M. WELCH,
BY
Whittemore, Hulbert & Belknap
ATTORNEYS.

ROTARY PUMP AND MOTOR HYDRAULIC TRANSMISSION

Original Filed June 10, 1952 9 Sheets-Sheet 8

INVENTOR.
CLINTON M. WELCH,
BY
Whittemore, Hulbert & Belknap
ATTORNEYS.

ROTARY PUMP AND MOTOR HYDRAULIC TRANSMISSION

Original Filed June 10, 1952 9 Sheets-Sheet 9

INVENTOR.
CLINTON M. WELCH,
BY
Whittemore, Hulbert & Belknap
ATTORNEYS.

United States Patent Office

Re. 24,064
Reissued Sept. 20, 1955

24,064

ROTARY PUMP AND MOTOR HYDRAULIC TRANSMISSION

Clinton M. Welch, Sault Sainte Marie, Mich.

Original No. 2,658,344, dated November 10, 1953, Serial No. 292,605, June 10, 1952. Application for reissue June 1, 1954, Serial No. 434,097

17 Claims. (Cl. 60—53)

Matter enclosed in heavy brackets [ ] appears in the original patent but forms no part of this reissue specification; matter printed in italics indicates the additions made by reissue.

This invention relates to hydraulic power transmissions and more particularly to a transmission for connecting a power source, such as an automotive vehicle engine, to power driven means, such as the traction wheels of the vehicle, and automatically adjusting the speed and torque factors of the power delivered to the driven means in accordance with variations in the load on the driven means.

It is among the objects of the invention to provide an improved hydraulic transmission of unitary construction which can be easily mounted on a suitable support, such as the frame of an automotive vehicle, and drivingly connected between a power source, such as a vehicle engine, and a driven means, such as a vehicle propeller shaft or differential unit connected in turn to the traction wheels of the vehicle; which is effective to vary the torque and speed factors of the power delivered to the driven means in accordance with variations in the load on the driven means to increase the torque and reduce the speed as the torque of the load on the driven means increases and reduce the torque and increase the speed as the torque on the driven means decreases; which includes means for limiting the transmitted power to a predetermined value without stopping the transmission; which utilizes variations in the pressure of the hydraulic fluid in the transmission to adjust the speed and torque factors of the output power to maintain the output power substantially equal to the input power and includes means providing counter-balancing fluid pressure to maintain the adjustment against further change until a change in input or output power occurs; which provides means retaining the hydraulic fluid in the transmission against leakage; which includes vane type hydraulic pump and motor devices, the vanes of which are positively controlled to provide silent, wear-free operation and substantially preclude leakage of hydraulic fluid past the vanes; which has all parts requiring servicing or adjustment arranged for ready accessibility; which is manually changed between its operative and its inoperative conditions and does not absorb or transmit power when in its inoperative condition; which is reversible in operation, so that power can be transmitted therethrough in either direction; and which is simple and durable in construction, practical and economical to manufacture, easy to install, and positive and efficient in operation.

Other objects and advantages will become apparent from a consideration of the following description and the appended claims in conjunction with the accompanying drawings wherein:

Figures 1A and 1B together constitute a medial, longitudinal cross sectional view of a hydraulic transmission illustrative of the invention;

Figure 2A is a transverse cross sectional view on the line 2A—2A of Figure 1A;

Figure 2B is a transverse cross sectional view on the line 2B—2B of Figure 1B;

Figure 3A is a transverse cross sectional view on the line 3A—3A of Figure 1A;

Figure 3B is a transverse cross sectional view on the line 3B—3B of Figure 1B;

Figure 4A is a transverse cross sectional view on the line 4A—4A of Figure 1A;

Figure 4B is a transverse cross sectional view on the line 4B—4B of Figure 1B;

Figure 5:
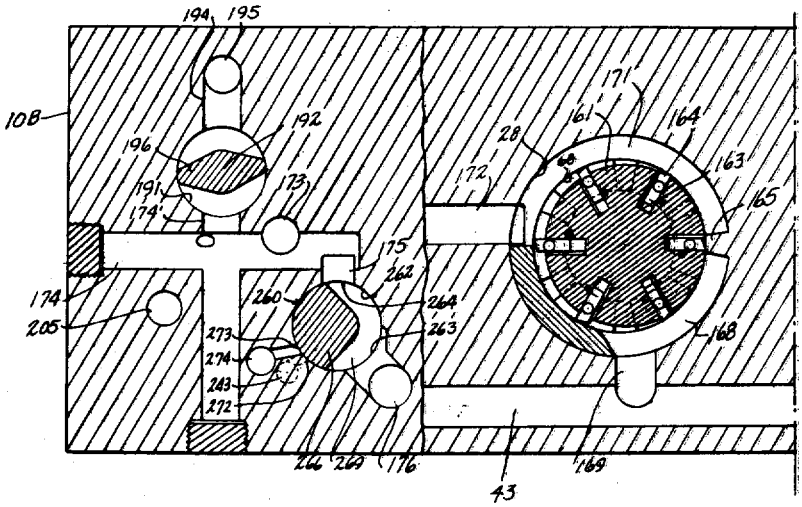
Figure 5 is a transverse cross sectional view on the line 5—5 of Figure 1A.

With continued reference to the drawings, the numeral 10 generally indicates the transmission housing which is formed in three separable parts including two end sections as designated at 10A and 10B and an intermediate or center section 10C. The end sections 10A and 10B are of substantially rectangular shape and are recessed in their abutting faces to provide a cavity 11 of elongated, rectangular shape which receives the inner section 10C which is of elongated, rectangular shape to fit and completely fill the cavity 11 provided in the end sections. One end portion of the section 10A extends past an end of the cavity, as indicated at 12, to the abutting face of the section 10B and this extension 12 is provided with bolt extensions 13 which extend through bolt holes 14 in the corresponding portion of the section 10B and receives nuts 15 which clamp the end sections together at the corresponding end of the housing. At the other end of the housing the end section 10B has an end extension 16 which extends past the adjacent end of the center section 10C of the housing and is provided at its distal end with bolt extensions 17 which extend through bolt holes in the adjacent portion of the section 10A and receives nuts 18 to secure the housing sections together at the corresponding end of the housing.

The housing is preferably formed in three parts, as indicated above, for convenience in manufacture and assembly, but if found advantageous, can be provided in more or less parts, if desired, without in any way exceeding the scope of the invention. It is to be also understood that the number of bolts securing the housing sections together is not limited to the four bolts 13 and 17, as shown in Figures 1A and 1B of the drawings.

The center section 10C is provided with two cylindrical chambers 19 and 20 extending transversely therethrough in spaced apart and parallel relationship to each other and the end sections 10A and 10B are provided with cylindrical recesses 21 and 22 in extension of the chamber 19 at the respectively opposite ends of the latter and cylindrical recesses 23 and 24 in extension of the chamber 20 at the respectively opposite ends of the latter chamber. The section 10A is also provided with bearing bores 25 and 26 extending from the recesses 21 and 23 respectively, eccentrically thereof, the bore 25 extending entirely through the section 10A to the outer surface of the section and the bore 26 being a blind bore terminating short of the adjacent outer surface of the section 10A of the housing.

The section 10B is provided with a bearing bore 27 extending from the recess 22 eccentrically of the latter and terminating short of the adjacent outer surface of the section. The section is further provided with a counterbore 28 constituting a pump chamber substantially coaxial of the bearing bore 27 and with a bore 27' of reduced diameter connecting the adjacent ends of the bore 27 and the pump chamber 28.

The pump chamber 28 extends to the outer surface of the section 10B and is closed at its outer end by a pump face plate 29 seated in an annular recess or groove at the outer end of the counterbore and secured to the outer face of the section 10B in closing relationship to the outer end of the pump chamber by studs 31 extending from the section 10B through apertures in the face plate 29 and nuts 32 threaded onto the studs at the outer side of the face plate.

A rotor shaft 33 extends eccentrically through the chamber 19 in the center housing section 10C and eccentrically through the recesses 21 and 22 in the housing end sections 10A and 10B and through the bearing bores 25 and 27 in the end sections. This shaft is journaled in the bore 25 by a bearing bushing 34 of cylindrical shape disposed in a counterbored intermediate portion of the bore and is journaled in the bearing bore 27 by a bearing bushing 35 of cylindrical shape disposed in a counterbored intermediate portion of the bore 27.

An oil seal bushing 36 is mounted on the shaft at the end of the bearing bushing 34 nearest the recess 21 in the section 10A and, while movable longitudinally of the shaft, is forced to rotate with the shaft by a spline connection 37 between the oil seal bushing and the shaft. Packing rings 38 surround the shaft within the oil seal bushing 36 and a compression spring 39 surrounds the shaft between the end of the oil seal bushing 36 remote from the bearing bushing 34 and a spring abutment ring 40 which surrounds the shaft and bears on an annular external flange 41 provided on the shaft, so that the spring holds the abutting ends of the oil seal bearing 36 and bearing bushing 34 in sealing engagement with each other. An oil seal 42 is disposed in a counterbore in the outer end of the shaft bearing bore 25 and surrounds the shaft at the outer surface of the housing end section 10A. A drain channel 43 leads from the bore 25 at a location between the oil seals 36 and 42 to the drain or sump of the transmission, so that any hydraulic fluid leaking through the seal 36 will be stopped by the low pressure seal 42 and returned to the sump of the transmission through the drain channel 43 provided in the housing section 10A. The shaft 33 extends outwardly of the oil seal 42 and the adjacent outer surface of the housing and is adapted to be connected at its outwardly extending end to a power source, such as the engine of an automotive vehicle, and constitutes the drive shaft of the transmission.

A rotor body 44 of cylindrical shape is disposed in the chamber 19 in the housing center section 10C and mounted on or formed integrally with the shaft 33 concentrically of the shaft, and has a diameter less than the diameter of the chamber 19. The rotor body 44 is provided with a plurality of vane slots 45 which extend radially of the body at equally spaced angular intervals therearound and longitudinally of the body from one end to the other. Vanes 46 of substantially rectangular cross sectional shape are slidably mounted one in each of the vane slots 45 for movement radially of the rotor body 44 toward and away from the rotational axis of the shaft 33. Each vane slot is provided in the face at the rear thereof with reference to the rotational direction of the rotor body 44 with spaced apart grooves 47 extending radially of the rotor body, so that hydraulic fluid can pass freely between the inner and outer ends of the vane slots and will not be trapped in the inner ends of the slots to interfere with inwad and outward movement of the corresponding vanes.

A governor block 48 of rectangular cross sectional shape is mounted in the space between the rotor body 44 and the wall of the chamber 19 at the bottom of the chamber (*Fig. 3A*) and is longitudinally curved, so that its outer surface has a partly cylindrical curvature fitting the wall surface of the chamber 19 and its inner surface has a partly cylindrical curvature parallel to the curvature of the outer surface thereof, the axis of curvature of the inner and outer surfaces of the governor block 48 being the longitudinal axis of the chamber 19 and the recesses 21 and 22. The rotor body 44 is nearer the wall of the chamber 19 at the side of the chamber adjacent the chamber 20 than the side of the wall of the chamber 19 remote from the chamber 20 and the governor block 48 is movable to a limited extent around the wall of the chamber 19, the arrangement being such that when the governer block moves in a direction toward the chamber 20 or in a direction opposite the direction of rotation of the rotor body 44, it moves closer to the peripheral surface of the rotor body and when it moves in the opposite direction or in the same direction as the direction of rotation of the rotor body 44, it also moves away from the peripheral surface of the rotor body, so that the effective area of the vanes 46 is decreased when the governor block moves opposite to the direction of rotation of the rotor body 44 and is increased when the governor block moves in the same direction as the direction of rotation of the rotor body.

The governor block 48 is disposed between the lower side of the rotor body 44 and the lower side of the chamber 19 (*Fig. 3A*) and grooves 49 are provided in the wall of the chamber 19 extending longitudinally of the governor block 48 for a purpose to be later described in detail. Slots 49' cut in the rear end of the governor block register respectively with the grooves 49.

A partition formation 50 extends from the wall surface of the chamber 19 to contact with the peripheral surface of the rotor body 44 at a location spaced from the front end of the governor block 48 with reference to the rotation direction of the rotor body 44 and at a location at which the vanes 46 are fully retracted relative to the peripheral surface of the rotor body and *along with block 48* divides the space within the chamber 19 surrounding the rotor body 44 into two separate parts, as indicated at 51 and 52.

A guide ring 53 of cylindrical shape is disposed in and substantially fills the recess 21 and this guide ring is provided with a centrally disposed bore 54 of a diameter greater than the diameter of the shaft 33, so that the guide ring 53 which is eccentric of the shaft 33, can move angularly relative to the shaft without binding. The guide ring 53 is provided with an annular groove 55 intermediate its length and an oil seal ring 56 is disposed in this groove and bears against the wall surface of the recess 21. At the end of the guide ring 53 remote from the rotor body 44 the housing section 10A is provided with an annular groove 57 which is concentric with the recess 21 and has the same outside diameter as the diameter of the recess.

A cylindrical guide ring 58 is disposed in and substantially fills the cylindrical recess 22 and is somewhat longer than the guide ring 53. The guide ring 58 is provided with a centrally disposed bore 59 through which the shaft 33 extends and which has a diameter greater than the diameter of the shaft, so that the guide ring 58 can also move angularly of the shaft without binding. The guide ring 58 is provided near its outer end with an annular groove 60 receiving an oil seal ring 61 which bears against the wall surface of the recess 22 and is provided in its outer end with an annular, concentric groove 62 receiving an oil seal ring 63 which bears against the surface of the end wall of the recess 22. The guide ring 53 is also provided with a concentric annular groove 64 in its outer end and an oil seal ring 65 seated in the groove 64 and bearing against the surface of the end wall of the recess 21.

The housing section 10B is provided at the outer end of the recess 22 with an annular groove 66 concentric with the recess and having an outside diameter equal to the diameter of the recess, the purpose of the grooves 57 and 66 to be later explained in detail.

The governor block 48 is disposed between the guide rings 53 and 58 and secured at its respectively opposite ends to the mutually opposed end surfaces of these rings by suitable means, such as the pins 67 projecting from the ends of the governor block and received in recesses provided in the corresponding ends of the guide rings near the outer edges of the latter.

The guide ring 53 is provided in its inner end with an annular groove 68 which is concentric of the guide ring, and the guide ring 58 is provided in its inner end with a corresponding, concentric annular groove 69.

Sector shaped elements 70 are disposed in the groove 68 in side by side relationship, and together constitute a multi-part ring movable around the groove 68, there being one sector 70 for each vane 46 of the driving rotor and similar sectors 71 are mounted in the groove 69. Each vane 46 is connected at its respectively opposite ends to corresponding sectors 70 and 71 by pins, as indicated at 72 and 73, projecting one from each end of the vane and received in apertures in the corresponding sectors 70 and 71.

The grooves 68 and 69 are eccentric of the rotational axis of the rotor body 44, and, as the shaft 33 and rotor body 44 rotate about the rotational axis of the shaft 33, the sectors 70 and 71 are moved around the grooves 68 and 69, and the vanes are positively moved radially inwardly and outwardly of the rotor body as the rotor rotates.

The governor block 48 is so positioned around the chamber 19 and its inner surface is so curved that the outer ends of the vanes 46 engage the inner surface of the governor block as the vanes are moved past this block, and movement of the governor block around the cylindrical wall surface of the chamber 19 brings the governor block to positions at which the vanes are protruded more or less from the rotor body 44, so that the effective vane area between the peripheral surface of the rotor body 44 and the inner surface of the governor block 48 is varied by movement of the governor block angularly of the cylindrical chamber 19.

The governor block 48 cooperates with the vanes 46 to provide the passage through which the hydraulic fluid is forced by the vanes from the space 52 at the inlet side of the pump passage to the space 51 which will normally constitute a high pressure space for the driving rotor.

The housing section 10B is provided with a second shaft bearing bore 75 extending from the end of the recess 24 remote from the chamber 20 to the adjacent outer surface of the section 10B and bearing bushings 76 and 77 are mounted in the bores 26 and 75 respectively. A driven shaft 78 extends through the bores 26 and 75 and through the recesses 23 and 24 and the chamber 20 and is journaled in the bearing bushings 76 and 77 and this shaft projects outwardly of the outer surface of the housing section 10B and is adapted to be drivingly connected to driven means, such as the propeller shaft or differential unit of an automotive vehicle which propeller shaft or differential unit is connected, in turn, to the traction wheels of the vehicle.

An oil seal bushing 79 surrounds the shaft 78 at the inner end of the bearing bushing 76 and is rotated by the shaft through a spline connection 80. Oil seal rings 81 surround the shaft 78 within the oil seal bushing 79 and a compression spring 82 surrounds the shaft between the end of the oil seal bushing 79 remote from the bearing bushing 76 and an annular spring abutment 83 supported on the shaft by an annular flange 84 on the shaft to hold the adjacent ends of the bushings 76 and 79 in sealing engagement with each other.

An oil seal bushing 85 surrounds the shaft 78 at the inner end of a bearing bushing 77 and is drivenly connected to the shaft by a spline connection 86. A compression spring 87 surrounds the shaft 78 between the end of the oil seal bushing 85 remote from the bearing bushing 77 and an annular spring abutment 88 supported on the shaft by an annular shoulder 89 on the shaft holds the abutting ends of the bushings 85 and 77 in sealing engagement, and oil seal rings 90 surround the shaft 78 within the oil seal bushing 85. An oil seal 91 is mounted in a counterbore at the outer end of the bore 75 and surrounds the shaft 78 at the surface of the housing section 10B from which the shaft projects, and the drain channel 43 and drilled holes 43′ and 43″ connect the bore 75 between the oil seals 85 and 91 and the closed end of the bore 26 to a sump or low pressure portion of the transmission, so that any hydraulic fluid leaking past the seal 85 will be returned to the transmission. Shaft bore 25 is also connected to the drain channel 43 by a drilled hole 43*a*.

A rotor body 93 of cylindrical shape is eccentrically disposed within the chamber 20 and mounted on or formed integrally with the shaft 78. This rotor body is provided with vane slots 94 extending radially and longitudinally thereof at substantially equal angular intervals therearound and each slot is provided in its [rear] *forward* wall with reference to the direction of rotation of the rotor body with spaced apart grooves 95 which extend from the inner to the outer edge of each slot to prevent hydraulic fluid from being trapped in the inner or bottom ends of the slots and interfering with movement of the corresponding vanes therein.

Vanes 96 of substantially rectangular shape are slidably mounted, one in each of the vane slots 94 and are movable radially toward and away from the rotational axis of the rotor body 93 in a manner to be presently described.

A guide ring 97 of cylindrical shape is received in and fills the recess 23 and a corresponding guide ring 98 is received in and fills the recess 24. The guide ring 97 is provided in its peripheral surface with an annular groove 99 and an oil seal ring 100 is mounted in this groove and bears against the cylindrical wall surface of the recess 23. This guide ring is also provided with an annular, concentric groove 101 in its end remote from the rotor body 93 and an oil seal ring 102 is received in the groove 101 and bears against the surface of the end wall of the recess 23.

The guide ring 98 is provided in its peripheral surface with an annular groove 103 receiving a packing ring 104 bearing against the cylindrical wall surface of the recess 24 and in its end remote from the rotor body 93 with a concentric annular groove 105 receiving a packing ring 106 bearing against the end wall surface of the recess 24.

The housing section 10A is provided with an annular groove 107 at the outer end of the recess 23 which groove is concentric with the adjacent recess and has an outside diameter substantially equal to the diameter of the recess, and the housing section 10B is provided with an annular groove 108 at the outer end of the recess 24 which is concentric with the recess 24 and has an outside diameter substantially equal to the diameter of this recess. The guide ring 97 has a central bore 109 larger than the shaft 78 and through which the shaft passes, and the guide ring 98 has a corresponding central bore 110 for the shaft.

The rotor body 93 is disposed nearer the side of the chamber 20 adjacent the chamber 19 than the side of the chamber 20 remote from the chamber 19, and a governor block 111 is disposed in the chamber 20 at the side [of the bottom] of this chamber remote from the chamber [10] *19* and is of rectangular cross sectional shape and longitudinally curved, so that its outer or convex side has a partly cylindrical curvature fitting the cylindrical wall surface of the chamber 20 and its inner surface has a partly cylindrical concave curvature parallel to the curvature of its outer side, the axis of curvature of the outer and inner sides of the governor block 111 being the longitudinal axis of the chamber 20 and the recesses 23 and 24. The governor block 111 is secured at its respectively opposite ends to the guide rings 97 and 98 by pins 112 which project from the ends of the governor block and are received in recesses in the mutually opposed faces of the guide rings.

The guide ring 97 is provided in its end adjacent the rotor body 93 with a concentric annnular groove 113 and the guide ring 98 is provided in its end adjacent the rotor body 93 with a corresponding concentric annular groove 114. Sector shaped elements 115 are disposed in the groove 113 and corresponding sector shaped elements 116 are disposed in the groove 114, the elements in each groove being disposed in side by side relationship and movable as a ring around the corresponding groove.

Each vane 96 of the driven rotor is connected at its respectively opposite ends to corresponding sectors 115 and 116 by pins, as indicated at 117 and 118, projecting from the respectively opposite ends of the vanes and received in apertures provided in the corresponding sectors 115 and 116.

With this arrangement, as the rotor body 93 rotates in the chamber 20 the sectors 115 and 116 are carried around the grooves 113 and 114 and positively move the vanes 96 inwardly and outwardly of the rotor body 93 as this body rotates.

The governor body 111 is angularly movable to a limited extent relative to the chamber 20 and is so arranged that when it moves in the direction of rotation of the rotor body 93 *clockwise as shown in Fig. 3B* it moves further from the peripheral surface of the rotor body, and when it moves in a direction opposite the direction of rotation of the rotor body *counterclockwise as shown in Fig. 3B*, it moves closer to the peripheral surface of the latter. *Under certain conditions, such as when the vehicle is being pushed to start the engine, or when the engine is used for braking, the pressure in space 127 will rise above the pressure in space 125, which will cause governor body 111 to approach its limit of counterclockwise movement and connect the grooves 125' in the housing section 10C to the grooves 111' in the governor body 111, thereby limiting the fluid pressure in space 127 to a predetermined value.*

The center housing section 10C is provided with a partition formation 120 which extends across the space between the rotor body 93 and the side wall surface of the chamber 20 at the side of the chamber 20 adjacent the chamber 19 into contact with the peripheral surface of the rotor body and *along with governing body 111* divides the space between the rotor body and the chamber wall surface into two parts, as indicated at 121 and 122.

A channel 123 in the center housing section 10C connects the space part 51 between the rotor body 44 and the wall surface of the chamber 19 to the space part 121 between the rotor body 93 and the wall surface of the chamber [20] *20*, and the spaces 51 and [121,] *121* and the channel 123 together constitute an upper pressure space collectively designated by the numeral 125.

A channel 126 also provided in the center section 10C of the housing connects the part 52 of the space between the rotor body 44 and the wall surface of the chamber 19 with the part 122 of the space between the rotor body 93 and the wall surface of the chamber 20, and the space parts 52 and 122 and the channel 126 together constitute a lower pressure space, collectively designated at 127.

The outer ends of the vanes 96 of the driven rotor contact the curved inner surface of the governor block 111 and have an effective area between the inner surface of the governor block and the peripheral surface of the rotor body 93 for rotating the driven rotor.

With this arrangement, when the driving rotor is driven by the shaft 33, it pumps hydraulic fluid from the lower pressure space 126 into the upper pressure space 123 (*Figs. 3A and 3B*), increasing the fluid pressure in the space 125 above the fluid pressure in the space 127, and this pressure differential acting upon the areas of the vanes 96 of the driven rotor between the driven rotor body 93 and the inner surface of the governor block 111 causes the driven rotor to rotate and turn the driven shaft 78.

A channel 128 extends through the center housing section 10C and includes a valve chamber 129 of cylindrical shape and a valve shaft 130 extends longitudinally through the valve chamber 129 and projects at one end from the housing section 10A, as indicated at 131 in Figures *1B and* 9. Within the valve chamber 129 the shaft is provided with oppositely projecting valve vanes 132 which are spaced apart longitudinally of the valve shaft and received in grooves 133 provided in the valve chamber between spaced apart and substantially parallel partition formations 134 on the housing center section 10C, which partition formations are disposed transversely of the valve chamber 129. The valve vanes carry fluid seals, as indicated at 135 and 136 (*Fig. 3B*), at their outer ends which seals contact the surface of the valve chamber when the vanes are disposed transversely of the channel 128 to block off the channel, the ends of the vanes being out of contact with the walls of the valve chamber when the vanes are disposed longitudinally of the channel or passage 128, so that in this position of the valve, fluid can flow freely from the channel 123 to the channel 126.

When the valve shaft 130 is in one operative position the channel 123 is connected to the channel 126 and hydraulic fluid pumped by the driving rotor merely recirculates from the upper pressure chamber [part] *part 51 of the driving rotor to the lower chamber part* 52 of this rotor, and does not turn the driven rotor. When the valve shaft 130 is disposed in its other operative position, the [channel] *channels* 128 [is] *are* blocked and the fluid pumped by the driving rotor must pass through and turn the driven rotor before it can return to the inlet side of the driving rotor.

From the valve chamber 129 the valve shaft 130 extends through a bore 137 in the housing section 10A and is provided in this bore with a bearing bushing 138 and a spring pressed oil seal 139, similar to the oil seals 36, 79 and 85 described above. A low pressure oil seal 140 is received in a counterbore at the outer end of the valve shaft bore 137 and a drain channel 141 leads from the bore 137 between the oil seals 139 and 140 to the drain channel 43 to return any oil leaking past the seal 139 to the low pressure portion or sump of the transmission.

It is contemplated that when the transmission is mounted in an automotive vehicle, the outer end of the valve shaft 130 will be connected to the accelerator pedal of the vehicle in a manner such that, when the accelerator pedal has been depressed to a predetermined extent it will rotate the valve shaft [131] *130* to close this bypass valve and when the accelerator pedal is released the bypass valve will be automatically opened.

With the above described arrangement, when the driving rotor rotates and increases the pressure in the upper pressure space 123 above the pressure in the lower pressure space 126, this pressure differential will tend to move the governor block 48 of the driving rotor in a direction to decrease the effective vane area of the driving rotor and the governor block 111 of the driven rotor in a direction to increase the effective vane area of the driven rotor, so that the torque delivered by the driven rotor will tend to increase relative to the torque applied to the driving rotor and the speed of the driven rotor will tend to decrease relative to the speed of the driving rotor, and with an increasing torque load applied to the driven rotor the torque delivered by this rotor will increase. Suitable means are provided, however, for controlling the movement of the governor blocks so that they do not move freely in the above noted manner, but have a controlled movement which accurately proportions the increase in torque delivered by the driven rotor to the increase in the torque load applied to this rotor.

Reaction pistons 143 and 144, as illustrated in Figure 2A, are mounted on the outer end of the guide ring 58 and received in the annular groove 66, these pistons being sealed to the groove wall surfaces by sealing rings 145 and 146, respectively. The pistons 143 and 144 are disposed at substantially diametrically opposite positions relative to the guide ring 58 and stop formations 147 and 148 on the housing section 10B close the groove 66 at diametrically opposite positions around the groove and are disposed one adjacent the piston 143 and one adjacent the piston 144 with the piston 143 disposed at the opposite side of the stop formation 147 from the piston 144, and the piston 144 being disposed at the opposite side of the stop formation 148 from the piston 143. A coiled compression spring 149 is disposed in the groove 66 between the piston 143 and the stop formation 147 and a similar spring 150 is disposed in the groove between the piston [148] *144* and the stop formation [144] *148*.

Pistons not illustrated, corresponding to the pistons 143 and 144, are mounted on the guide [rings] *ring* 53 and disposed in the groove 57 at diametrically opposite positions around the groove, and stop formations, not illustrated, on the housing section 10A extend into and close the groove 57 at diametrically opposite positions therearound. Springs, also not illustrated, corresponding to the springs 149 and 150, are disposed in the groove 57 between the pistons on the guide ring 53 and the corresponding stop formations.

Figure 9:
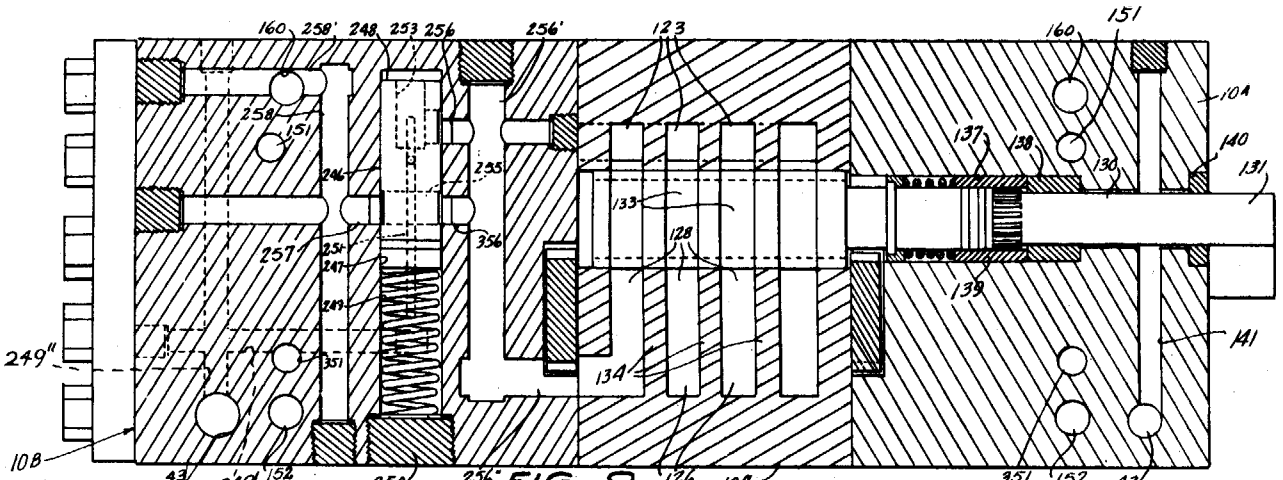
Figure 9 is a cross sectional view on the line 9—9 of Figure 2B.

Fluid channels 151 (*see Fig. 9*) extend through the upper portions of the housing sections 10A and 10B at locations spaced outwardly from the closed ends of the recesses 21 and 23 and the recesses 22 and 24 respectively, and one of these channels is connected to the grooves 66 and 108 by ports 151a and 151b respectively (*Figs. 2A and 2B*), and to the upper pressure space channel 123 by ports 151c and 151d (*Figs. 3A and 3B*). The other channel 151 is connected to the grooves 57 and 107 and to the channel 123 by similar ports, not illustrated.

The port 151a leads into the groove 66 between the piston 143 and the stop formation 147 and the corresponding port leads into the groove 57 at a similar position to apply fluid pressure from the upper pressure space 123 to the piston 143 on guide ring 58 and the corresponding piston on guide ring 53 in a direction to counteract the movement of the governor block 48 induced by the pressure differential between the upper and lower pressure spaces 123 and 126.

Fluid channels 351 also extend longitudinally of the lower portion of the housing sections 10A and 10B respectively (*Fig. 9*), one between the grooves 57 and 107 and the other between the grooves 66 and 108 at locations spaced outwardly from the closed ends of the adjacent recesses 21 and 23 and 22 and 24 and one of these channels is connected to the grooves 66 and 108 by ports 351a and 351b and to the lower pressure space channel 126 by ports 351c and 351d (*Figs. 2A, 2B, 3A and 3B*). The other channel 351 is connected to grooves 57 and 107 and to the channel 126 by similar ports and the channels 351 and associated ports are effective to apply fluid pressure from the lower pressure space 126 to piston 143 at the side of this piston remote from port 151a and to the equivalent side of the corresponding piston on guide ring 53, so that the pistons resisting movement of governor block 48 are subjected to the same fluid pressure differential as the governor block.

The effective area of the piston 143, and the corresponding piston, is less than the effective end area of the governor block 48 by a predetermined amount, so that there is still a residual force tending to move the governor block 48 in a vane area reducing direction.

A fluid channel [52] *152* (*Figs 1A and 1B*) leads from a source of fluid at a regulated pressure, later to be described, through a port 152a to the space between the piston 144 and the stop formation 148 (*Fig. 2A*) and through a similar port, not illustrated, to the space between the corresponding piston on guide ring 53 and stop formation in groove 57. The pressure of the fluid thus supplied is regulated by an adjustable pressure regulating valve [to a valve] such that the pressure exerted on the piston 144 and the corresponding piston, exactly balances the residual force tending to move the governor block when the governor block has been moved to a predetermined amount in its vane area reducing direction.

The compression springs 149 and 150 are not utilized in the ordinary operation of the transmission, but come into play only when the load on the driven shaft reaches the predetermined capacity of the transmission to stop the governor block at a predetermined position after it opens the relief passage 49 and permits the hydraulic fluid in the upper pressure space 123 to bypass into the lower pressure space 126 to thereby limit the fluid pressure built up by the driving rotor to a safe value.

Pistons 153 and 154 project from the outer end of the guide ring 98 into the groove 108 at diametrically opposite positions around the guide ring and stop formations 155 and 156 on the housing end section 10B extend into the groove 108 at diametrically opposite locations around the groove spaced from the locations of the pistons 153 and 154. Compression springs 157 and 158 are disposed, one between the piston 153 and the stop formation 155, and the other between the piston 154 and the stop formation 156, and the port 151b leads from the channel 151 to the space between the piston 153 and the stop formation 155. The port 351b leads into groove 108 between piston 153 and stop formation 156 and the differential fluid pressure acting on the piston 153 resists movement of the governor block 111 in its vane area increasing direction, but the effective area of the piston 153 and its complementary piston on the guide ring [98] *97* is less by a predetermined amount than the effective end area of the governor block 111, so that a residual force is left tending to move the governor block in its vane area increasing direction.

Pistons, not illustrated, complementary to the pistons 153 and 154 are provided on the guide ring 97 and extend into the groove 107, and stop formations, not illustrated, on the housing section 10A, complementary to the stop [formation] *formations* 155 and 156, extend into the groove 107 and close the groove at diametrically spaced locations therearound. Compression springs, also not illustrated, complementary to the compression springs 158 and [159,] *157* are disposed between the corresponding pistons and stop formations in the grooves 107.

The port 152b leads from the channel 152 into the space between the piston 154 and the stop formation 156 (*Fig. 2B*) and a corresponding port leads into the space between the piston on the guide ring 97 and the corresponding stop formation in the groove 107.

Channels 160 extend longitudinally of the housing sections 10A and 10B adjacent and substantially parallel to the channels 151 and a port 160a connects one of these channels into the groove 66 between piston 144 and stop 147 (*Fig. 2A*). A port 160b connects this same channel 160 into the groove 108 between piston 154 and stop 155

(*Fig. 2B*). Corresponding ports connect the other channel 160 into the grooves 57 and 107 at corresponding locations.

A cross channel 160' connects the channels 160 at the ends of these channels at the side of rotor chamber 19 remote from rotor chamber 20 and channels, later to be described, connect the cross channel 160' to a source of fluid at a regulated pressure to maintain a predetermined fluid pressure acting against the reaction pistons in opposition to [the same] regulated fluid pressure applied to the reaction pistons through channels [351] *152* for a purpose to be later explained.

A pump rotor body 161 is disposed in the pump chamber 28 and mounted on a pump shaft 162 which extends longitudinally from the adjacent end of the drive shaft 33 and is drivingly connected at one end to the drive shaft. The pump body 161 is of cylindrical shape and has longitudinally and radially disposed vane slots 163 opening to the peripheral surface thereof at substantially equal angular intervals therearound and vanes 164 slidably mounted, one in each of the vane slots 163.

The pump rotor body 161 is eccentrically disposed relative to the pump chamber 28 and a stop formation 165 projects from the cylindrical wall of the pump chamber into contact with the peripheral surface of the pump rotor body 161 at a location around the rotor body at which the vanes 164 are fully retracted within the peripheral surface of the rotor body.

The pump face plate 29 is provided with an annular groove 29' in the face thereof adjacent the pump rotor and sectors 166 are mounted in this groove in side by side relationship and extend around the groove in ring formation. The groove 29' is eccentric relative to the rotational axis of the pump rotor body 161 and the pump vanes 164 are connected each to a sector 166 by suitable means, such as the pins 167 projecting one from each vane and engaged in an aperture in a corresponding sector. A circular groove 329 is provided in 10B at the side of pump chamber 28 opposite groove 29' and coaxial with the latter and apertured sectors 366 are disposed in groove 329 and receive pins 167 on vanes 164. With this arrangement, the vanes are positively moved inwardly and outwardly radially of the pump rotor body 161 as the rotor body is turned in the pump chamber 28.

The pump has an inlet space 168 (*Fig. 5*) extending from the stop formation 165 past a fluid inlet port 169 connected [by a channel 170] to the drain channel 43 (*Fig. 4A*), and a fluid outlet space 171 extending from the pump outlet channel 172 to the other side of the stop formation 165.

The pump outlet channel 172 is connected by fluid channels 173, 174 and 175 and the cross channel 176 to the channels 152 (*Fig. 1A*).

A valve chamber 177 in the form of a cylindrical bore in the housing section 10B opens to one end surface of the housing section and has a screw threaded counterbore at its outer end receiving a screw plug 177' (*Figs. 1A and 2A*). The screw plug 177' has a boss extending into the adjacent end of the valve chamber 177 and this boss is provided with an annular groove 178 connected by a channel 178' to the passage 175 and connected by angularly spaced apart fluid passages 179 to the inner end of a centrally disposed blind bore 180 in the plug 177' which bore extends through the boss having the groove 178 therein to the outer end of the boss.

A slide block 181 is slidably mounted in the valve chamber 177 and provided with longitudinally extending rack teeth 182, and a piston 183 extends from one end of the slide block 181 into the bore 180 in the plug 177'.

At its end remote from the plug 177' the valve chamber 177 is provided with a second counterbore 184 and an abutment block 185 is slidably mounted in the counterbore 184 and has at one end cam following rollers 186 engaging a circumferentially extending cam surface 187 at the bottom of a groove formed in the peripheral surface of the guide ring 58.

A compression spring 188 is disposed between the slide block 181 and the abutment block 185 and held in position by spring guides 189 and 190 projecting from the slide block 181 and disposed within the hollow abutment block 185 respectively.

A valve chamber 191 (*Figs. 4A and 5*) in the form of a cylindrical bore in the housing section 10B is disposed adjacent and substantially perpendicular to the bore 177 and a valve 192 is rotatably mounted in the valve chamber 191 and provided at one end with a pinion gear 193, Figure 2A, the teeth of which mesh with the rack teeth 182 on the slide block or plunger 181 to rotate the valve body 192. A channel 174' leads from the channel 174 into the valve chamber 191 and a channel 194 leads from the valve chamber 191 into a branch channel 195 which is connected by a channel 195' to the cross channel 160'.

At the location at which the channels 174' and 194 intersect the valve chamber 191, the valve body 192 is provided with a vane formation 196 which controls the connection between the passages 174' and 194.

The rotational position of the valve body 192 is controlled by movement of the slide block 181 from the pressure of the hydraulic fluid exerted on the outer end of the piston 183 compressing the spring 188, the force required to compress this spring being varied by movement of the abutment block 185 by the cam surface 187 on the guide ring 58, so that the pressure between the pump outlet channel 172 and the pressure regulating valve 192 is controlled by the strength of the spring 188 modified by the position of the cam surface 187 and this fluid pressure is such that when applied to the corresponding reaction pistons on the guide rings, it balances the residual pressure acting on the rotor governor blocks at the particular positions of the governor blocks to hold the blocks against further movement by fluid pressure in the upper pressure chamber 125 until a change occurs in the load applied to the driven rotor or the power applied to the driving rotor.

Figure 8:
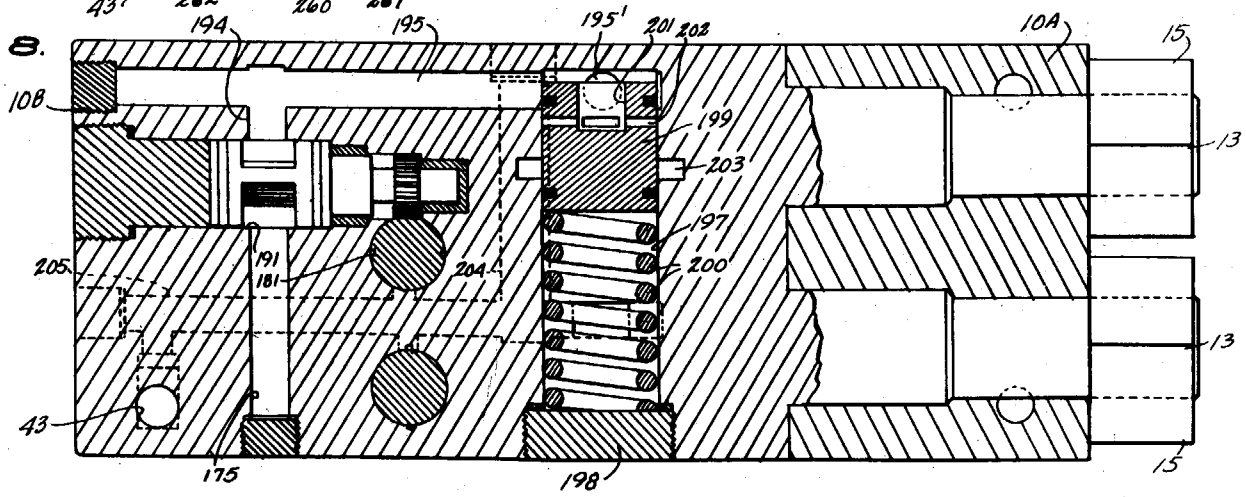
Figure 8 is a longitudinal cross sectional view on the line 8—8 of Figure 1A.

A valve chamber 197 (*Figs. 1A and 3A*) in the form of a cylindrical bore is provided in the housing section 10B at a location spaced from the bores [176] *177* and 191 and this bore 197 is a blind bore closed at one end by the material of the section 10B and opening at its other end to the surface of the section 10B where it is closed by a screw plug 198 threaded into a screw threaded counterbore at the outer end of the bore 197. A valve piston 199 is slidably mounted in the bore 197 adjacent the inner end of the bore and a compression spring 200 is disposed in the bore 197 between the piston 199 and the screw plug 198. The piston 199 is provided with a central well or recess 201 in its end adjacent the inner end of the bore 197 and with radial ports 202 extending from the inner end of the recess 201 to the surface of the piston and the channel 195 leads at one end into the bore 197 at the closed end of the latter. At a location spaced from its inner closed end, the bore 197 is surrounded by a groove 203 and this groove is connected by perpendicularly disposed intersecting channels 204 and 205 with the drain channel 43 (*Fig. 8*). The channel 205 is also connected at one end into the valve chamber [97] *197* between the piston 199 and the closure plug 198. Fluid pressure from the channel 195 acts on the piston 199 to force the piston against the spring 200 until the ports 202 register with the annular groove 203 to vent the fluid to the drain channel 43. The valve piston 199 thus regulates the pressure of the fluid fed to the lower pressure space 127 and to the reaction pistons through the channels 160.

It is to be noted that between the bearing bushing 35 at the pump end of the shaft 33 and the rotor body 44 there is provided an oil seal bushing 207 driven by the shaft 33 through the spline connection 208 and pressed against the adjacent end of the bearing bushing 35 by a compression spring 209 which surrounds the shaft 33 between the end of the oil seal bushing 207 remote from the bearing bushing 35, and an annular spring abutment 210 supported on the shaft by an external annular flange or collar 211 on the shaft.

With the structure so far described, while the power source is driving the shaft 33 and the shaft 78 is driving the load, the driving rotor on the shaft 33 will increase the fluid pressure in the upper pressure space [25] *125* relative to the fluid pressure in the lower pressure space 127 and, with the [clutch] *by-pass* valve 130 closed, this pressure differential produced by the driving rotor will drive the driven rotor and the governor blocks of the driving and driven rotors will move, decreasing the effective vane area of the driving rotor, and increasing the effective vane area of the driven rotor until the torque required at the driven rotor is provided by the power supplied to the driving rotor and the two governor blocks will be held in proper position for each ratio of power input to torque output of the transmission. The transmission will be maintained filled with hydraulic fluid and a predetermined minimum pressure maintained at all times in the lower pressure space 127 to insure the maximum efficiency of the driving rotor.

Fluid pressure from the upper pressure space is applied to one side of one of the reaction pistons on each guide ring and at the same time, fluid pressure from the fluid pump outlet is applied to one face of the other piston on each guide ring concurrently with the fluid pressure from the upper pressure space, so that the force exerted by fluid pressure on the reaction pistons balances the force exerted by the fluid pressure in the upper pressure space on the governor block. Fluid at the pressure in the lower pressure space 127 is also applied to the sides of the reaction pistons opposite the sides to which the upper fluid pressure space pressure and the pump outlet pressure are applied and cancels out when the driving rotor is driving the driven rotor.

Figure 6:
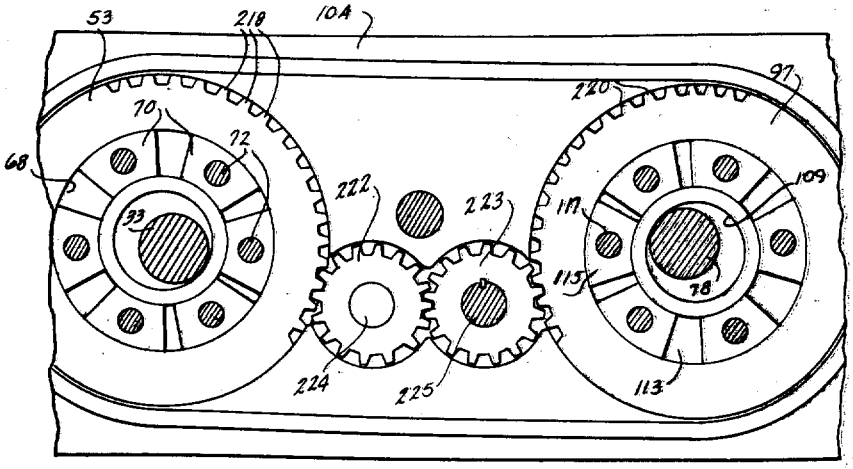
Figure 6 is a fragmentary transverse cross sectional view on the line 6—6 of Figures 1A and 1B.
Figure 7:
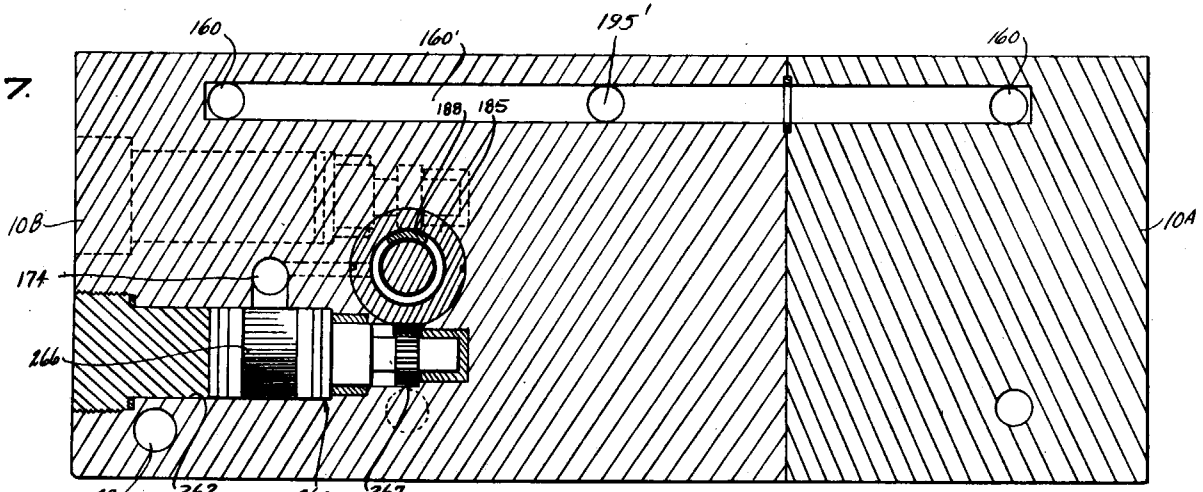
Figure 7 is a longitudinal cross sectional view on the line 7—7 of Figure 1A.

The two governor blocks 48 and 111 are connected together for simultaneous and coextensive movement in respectively opposite directions by gear means, particularly illustrated in Figure 6. Each of the guide rings is provided with a series of peripheral gear teeth, as indicated at 218, 219, 220 and 221, for the guide rings 53, 58, 97 and 98 respectively, and idler gears, as indicated at 222 and 223 are mounted in recesses in the housing end members 10A and 10B, one pair between the guide rings 53 and 97, and one pair between the guide rings 58 and 98. The idler gears 22 and 23 mounted between the guide rings 53 and 97, as illustrated in Figure 6, mesh with each other and the idler gear 222 meshes with the teeth 218 on the guide ring 53, while the idler gear 223 meshes with the gear teeth 220 on the guide ring 97. The idler gear 222 is rotatably mounted on a stud, as indicated at 224, projecting from the housing end section 10A and the idler gear 223 is mounted on one end of a shaft 225 which extends through the center section 10C and carries the corresponding idler gear at the other side of the center section on its other end. The idler gears at the opposite side of the center section are similarly mounted in recesses in the housing section 10B and one of them on a stud projecting from this housing section.

Figure 10:
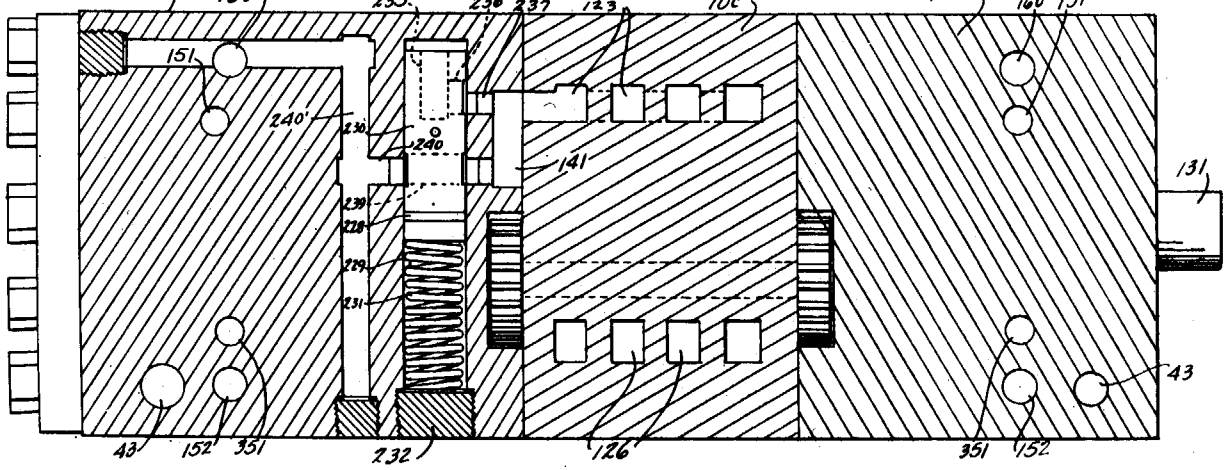
Figure 10 is a cross sectional view on the line 10—10 of Figure 2B.
Figure 11:
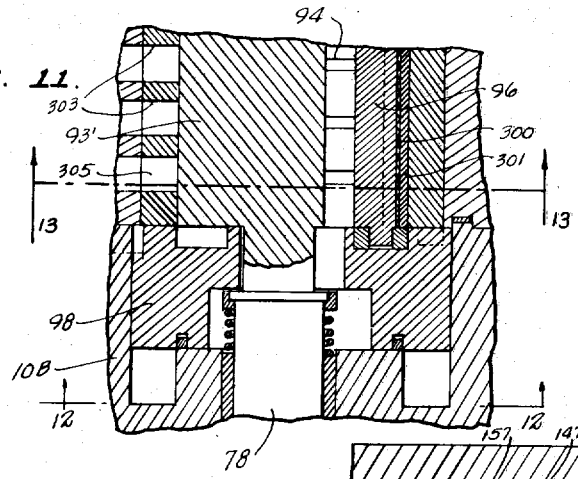
Figure 11 is a fragmentary cross sectional view in the plane of the cross section of Figure 1B, being a sectional view on the line 11—11 of Figure 13, showing a somewhat modified form of the device.

A feeder valve, generally indicated at 228 (*Figs. 1B, 2B and 10*), is interposed between the pressure relief valve 199 and the [lower pressure space 127] *upper pressure space 125* to which fluid is supplied at a pressure controlled by the relief valve 199. This feeder valve comprises a cylindrical bore 229 in the housing section 10B, opening to one face of the housing section and terminating short of the opposite face of the latter, a valve piston or plunger 230 slidably mounted in the bore 229, and a compression spring 231 interposed between the valve piston 230 and a screw plug 232 closing the outer open end of the bore 229. A groove 233 extends longitudinally of the bore 229 intermediate the length of the latter and a spring pressed detent 234 is disposed in a transverse blind bore in the valve plunger 230 and has its outer end slidably received in the groove 233 to hold the plunger or piston 230 against rotation in the bore 229 constituting the valve chamber.

At its end remote from the spring 231 the valve piston 230 is provided with a coaxial well 235 which opens near its bottom to the cylindrical surface of the piston, as indicated at 236, and a channel 237 leads from the valve chamber at the location of the opening 236 to the channel 123 of the upper pressure space 125, so that the pressure of the hydraulic fluid in the upper pressure space 125 is applied to the feed valve piston 230 in a direction to compress the associated feed valve spring 231. The piston 230 has a valve port 239 extending transversely therethrough between the bottom or inner end of the well 235 and the end of the piston engaged by the spring 231 and the housing section 10B is provided with ports which register with the transverse valve port 239 when the valve spring 231 is [compressed] *not compressed* by fluid pressure in the upper pressure space 125. Channels [240, 240' and 240''] *240 and 240'* lead from the inlet port of the feeder valve 228 to one of the channels 160 connected to the pressure relief valve 199, as described above, and the channel 237 is extended, as indicated at 141, to connect the channel 160 to the channel 123 through the transverse valve passage 239.

When the pressure in the upper pressure space 125 is below the pressure in channel 160 by a predetermined amount, the valve 228 opens, so that hydraulic fluid will flow from the channel 160 into the upper pressure space 125. When the pressure in the upper pressure space [is above] *approaches* the pressure in channel 160, valve 228 closes, so that hydraulic fluid cannot escape from the upper pressure space through the pressure relief valve 199.

All of the mechanism necessary for proper operation of the transmission when the shaft 33 is driving the shaft 78 has now been described, but additional mechanism is required when the torque is reversed, as when the vehicle in which the transmission is mounted overruns the engine during deceleration of the vehicle or on a downgrade wehn the gravity induced speed of the vehicle exceeds the engine speed.

Under a torque reversal, as described above, the rotor 93 becomes the driving rotor, and the rotor 44 the driven rotor, so that the fluid pressure in the lower pressure space 127 will now exceed the fluid pressure in the upper pressure space 125. Upon a reversal of pressure between the upper and lower pressure spaces the two governor blocks are urged in a direction to increase the effective vane area of the engine driven rotor, and decrease the effective vane area of the wheel driving rotor. This permits the wheel driving rotor to rotate at a speed higher than the rotational speed of the engine driven rotor, the pressure for driving the engine driven rotor being retained in the lower pressure space 127 by a second feed valve 246.

The second feeder valve 246 (*Figs. 1B, 2B and 9*) includes a cylindrical, blind bore 247 in the housing section 10B preferably adjacent and substantially parallel to the bore 229, the bore 247 also being closed at one end by the material of the housing section 10B and opening at its other end to the same face of the housing section to which the bore 229 opens. A valve plunger or piston 248 is slidably mounted in the bore 247 adjacent the closed end of this bore, and a compression spring 249 is disposed between the piston 248 and a screw plug 250 closing the outer, open end of the bore 247. The bore 247 is provided with a longitudinally extending groove 251 intermediate the length thereof and a spring pressed detent 252 mounted in a transverse aperture in the piston 248 has its outer end engaged in the groove 251 to hold the piston 248 against rotation in the bore 247. The piston [247] *248* is provided in its end remote from the spring 249 with a coaxial well or recess 253 opening at its bottom or inner end to the side surface of the piston, as indicated at 254, and between the inner end of the recess 253 and the end thereof engaged by the spring 249 the piston is provided with a transverse passage 255.

A channel 256 leads through the channels 256' and 256" to the channel 126 of the lower pressure space 127 into the closed end of the bore 247 to apply the fluid pressure in the lower pressure space 127 to the piston 248 in a direction to [compress] the spring 249 and bring the passage 225 [into] *out of* registry with ports provided in the housing section 10B at diametrically opposite sides of the bore 247. A branch channel 356 leads from the channel 256' to the [outlet] *inlet* port of the valve 246.

Channels 257, 258 and 258' connect the inlet port of the valve 246 to one of the channels 160 to supply fluid at the pressure in channel 160 to the lower pressure space 127 when valve [146] *246* is open. When the torque transmitted through the transmission is reversed, hydraulic fluid will be supplied at a pressure regulated by the pressure relief valve 199 to the upper pressure space 125 to insure that the transmission is filled with fluid at all times, and when the pressure in the lower space 127 exceeds the pressure in the upper space 125, the feed valve 246 closes, so that the pressure in the lower space cannot then leak from the lower pressure space through the relief valve [199] *199. The spaces occupied by the springs in both feeder valve chambers are connected by passages 249' and 249" to drain passage 43.*

A rotatable valve, generally indicated at 260 (*Figs. 2A and 5*), is interposed between the pressure relief valve 192 and the line 176 conducting fluid from the outlet of the pump 161 to the channels 152.

The valve 260 comprises a valve chamber 262 in the form of a cylindrical bore provided in the housing body 10B and having angularly spaced apart ports 263 and 264 leading to the channels 175 and 176, and a valve body 266 rotatably mounted in the chamber 262. At one end the valve body 266 is provided with a pinion 267 the teeth of which mesh with a rack 268 on the abutment block 185, so that movement of the abutment block 185 rotates the valve body 266 in the valve chamber 262. The valve body 266 has a fluid passage 269 extending transversely thereof which normally connects the ports 264 and 263.

The cam surface 187 in the guide ring 58 extends spirally of the peripheral surface of the guide ring and on a carefully calculated curve to maintain the balancing fluid pressure on the reaction pistons, as described above, when the engine driven rotor is driving the wheel driving rotor of the transmission. This cam surface is deeply recessed, as indicated at 270, at its end which engages the cam followers 186 when the torque is reversed between the wheel driving and engine driven rotors and the governor blocks are moved in the corresponding direction, as explained above. When the cam followers 186 ride into the deep or recessed end 270 of the cam surface 187, the abutment block 185 is moved to a limiting position and in this movement, rotates the valve body 266 until the valve body cuts off the port 264 from the port 263 and thereby cuts off the pump outlet pressure from the channels 152 and the reaction pistons of the [rotors.] *rotors which are connected to the channels 152.*

The valve 260, in addition to the ports 263 and 264 connecting the channels 175 and 176, has two additional ports, as indicated at 272 and 273, of which the port 273 is connected to the drain channel 43 by a channel 274.

A third pressure relief valve 280 is provided and comprises a valve chamber 281 in the form of a bore in the housing section 10B opening to one end of the section and closed at its outer end by a screw plug 282. At its end remote from the screw plug the chamber 281 has an extension 283 of reduced diameter connected at its closed end to the channel 243 leading from the valve port 272. A piston 284 is slidably mounted in the chamber 281 and has a reduced extension 285 received in the chamber extension 283. A compression spring 286 is disposed in the chamber 281 between the piston 284 and the screw plug 282 and the chamber and extension 283 are provided with longitudinally extending grooves 287 leading from the chamber extension 283 past the piston 284 in the chamber 281 and normally closed by the piston. A channel 288 leads from the valve chamber 281 to the drain channel 205 and connects the channel 243 to the drain channel 205 when the piston 284 is moved against the force of spring 286 sufficiently to uncover the portions of the grooves 287 in the chamber extension 283.

When a torque reversal through the transmission moves the governor blocks and turns the valve body 266 in the manner indicated above, the valve body cuts off the port 264 to discontinue application of fluid at the pressure regulated by pressure relief valve 192 to the reaction pistons through channels 152, but prior to closing port 264, opens port 272 to connect the channels 152 and the pump outlet to the pressure relief valve 280. If now the torque direction is restored by increasing the engine power, any fluid trapped in the reaction piston grooves in the spaces supplied by the regulated pump outlet pressure can escape through the relief valve 280 permitting the governor blocks to move back and the effective vane areas of the two rotors to change, so that the engine can pick up the load without stalling.

Continued closing movement of valve body 266 after opening port 272 opens port 273 and connects the spaces in the reaction piston grooves supplied with fluid at the regulated pump outlet pressure with drain to relieve the pressure in these spaces and render the entire pressure regulated by the pressure relief valve 199 effective to resist movement of the governor blocks in the reverse direction and thus insure transmission of a substantial reverse torque from the wheel driving to the engine driven rotor of the transmission.

In addition to the springs, as indicated at 149, 150, 157 and 158, there are compression springs at the opposite sides of the corresponding reaction pistons or vanes, as indicated at [290, 291, 292 and 293] *190, 191, 192 and 193* in Figures 2A and 2B, which abut against the corresponding stop formations, as indicated at 147, 148, 155 and 156, when the governor blocks move to their extreme reverse position, and provide limit stops for the reaction pistons and for the governor blocks to cushion the stopping of the pistons and governor blocks when the governor blocks are driven to the extreme reverse position by a sufficient pressure differential between the lower and upper pressure spaces.

In the modified arrangement illustrated in Figures 11 to 14 inclusive, the construction is the same as that illustrated in the previous figures and described above, with the exception that the rotor vanes 46 and 96 are provided with longitudinally extending slots 300 in their outer ends and packing strips [301] *301'* of suitable flexible and resilient material are mounted one in each of these grooves and bear against the inner surfaces of the corresponding governor blocks to provide fluid seals between the vanes and the governor blocks.

In this arrangement each governor block, instead of being of generally rectangular shape, as described above, is a complete hollow cylinder, as indicated at 302, eccentrically surrounding the associated rotor body 93' within the corresponding chamber 20', and has circumferentially extending slots 303 therein spaced apart longitudinally thereof, the inner surface of the cylinder portions between adjacent slots as well as the inner surface portion of the cylinder between the ends of the slots providing tracks or guideways on which the packing strips [301] *301'* ride as the rotor body rotates in the governor cylinder. While the number of slots in the governor cylinder may be varied, four equally spaced apart slots each having a width substantially equal to one eighth of the length of the cylinder is considered to provide a satisfactory arrangement.

With the above described construction of the governor block, it is not possible to assemble the device if the partition formations, such as the formation 120 of Figure 3B, are made integral with the center housing section 10C.

The partition formations are, therefore, omitted from the center housing section and this housing section is provided with socket recesses 304 opening one into each of the governor cylinder slots 303. The partition formation is then provided as a plurality of separate blocks 305 of rectangular cross sectional shape having a thickness substantially equal to the width of the slots 303 and having at one end a boss received in the corresponding socket recess 304. The partition blocks 305 are disposed one in each slot 303 and each has a concave end surface 306 bearing against the peripheral surface of the associated rotor body and recesses 307 of elongated rectangular shape provided one in each side thereof and each receiving a packing element 308 which packing elements bear against the side wall surfaces of the slots 303 to provide fluid seals between the partition blocks and the governor cylinders.

The housing section is provided with a transverse bore extending through the socket recesses 304 and the bosses on the blocks are provided each with a transverse aperture 309 registering with the bore in the center housing section, and a locking pin 310 extends through the bore in the housing section and the apertures in the block bosses to lock the bosses in the socket recesses 304.

Figure 12:
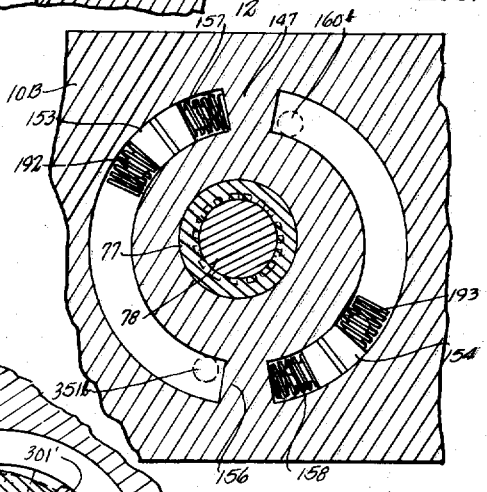
Figure 12 is a cross sectional view on the line 12—12 of Figure 11.
Figure 14:
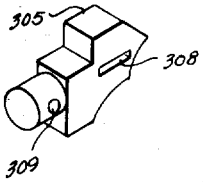
Figure 14 is a perspective view of a hydraulic motor partition member as shown in Figure 13.
Figure 13:
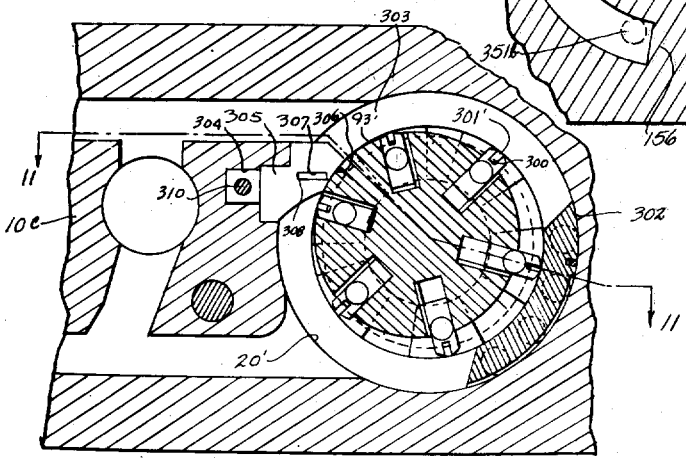
Figure 13 is a cross sectional view on the line 13—13 of Figure 11.

As the governor blocks will have a smaller effective end area when the vane packing seals are used, the reaction piston grooves will be much narrower and the reaction pistons will have a proportionately decreased area, as shown in Figure 12.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

[1. A hydraulic transmission comprising a housing having spaced apart cylindrical chambers, shaft bearing openings, valve chambers and fluid passages therein, shafts journaled in said shaft bearing openings and extending eccentrically one through each of said chambers, said shafts projecting beyond said housing and being adapted for connection one to a power source and the other to driven means, cylindrical driving and driven rotors disposed one on each of said shafts coaxially thereof and received in the corresponding chambers, each of such rotors having a diameter less than the diameter of the corresponding chamber and angularly spaced apart and radially disposed vane slots therein, vanes slidably mounted one in each of said slots and projecting from the peripheral surface of the corresponding rotor, guide rings of cylindrical shape journaled in said chambers one at each end of each rotor and rotatably receiving the corresponding shafts, each of said guide rings having in its end adjacent the corresponding rotor an annular groove concentric with the corresponding chamber and said housing having annular grooves disposed one at each end of each chamber and concentric with the corresponding chambers, sectors slidably mounted in the grooves in said guide rings for movement around the corresponding annular grooves, means connecting each vane to two sectors disposed one at each end of the vane for movement of said vanes outwardly and inwardly of the corresponding rotors as said rotors rotate in the corresponding chambers, longitudinally curved governor blocks slidably mounted one in each chamber between the corresponding rotor and the chamber wall and connected each at its opposite ends to the corresponding guide rings, each of said governor blocks having its outer surface in contact with the wall of the corresponding chamber and its inner surface spaced from the peripheral surface of the corresponding rotor and being movable toward and away from the adjacent rotor surface upon angular movement of the associated guide rings in the chamber to maintain the inner surfaces of the governor blocks in engagement with the outer ends of the corresponding vanes at different amounts of effective vane area projecting beyond the peripheral surfaces of the corresponding rotors, partition formations on said housing projecting one into each of said chambers to the peripheral surfaces of the corresponding rotors at locations at which the rotor vanes are fully retracted within the peripheral surfaces of said rotors and together with said governor blocks dividing the space within each chamber surrounding the corresponding rotor into two separate portions, one of the fluid channels in said housing connecting the space portion in one of said chambers between the rear end of the corresponding governor block in the direction of rotation of the corresponding rotor and the associated partition formation to the space portion in the other of said chambers between the forward end of the corresponding governor block in the direction of rotation of the corresponding rotor and the associated partition formation, and constituting such space portions and channel an upper pressure space, and another of the channels in said housing connecting the other space portions in said chambers and providing a lower pressure space, said governor blocks being movable to a limited extent around the corresponding rotors upon a rise in fluid pressure in said upper pressure space above the fluid pressure in said lower pressure space to simultaneously decrease the effective vane area of said driving rotor and increase the effective vane area of said driven rotor, one of the valve chambers in said housing connecting said upper and lower pressure space channels to provide a bypass for said driving rotor, a manually movable valve in said valve chamber effective to close said chamber and force the fluid to pass from said upper pressure space around said driven rotor to said lower pressure space and constrain said driven rotor to rotate in response to rotation of said driving rotor, angularly spaced apart pistons on each guide ring at the ends of the guide rings remote from said rotors and received in the adjacent annular grooves in said housing, stop formations on said housing intercepting said annular grooves between the angularly spaced apart pistons in each groove, some of the fluid channels in said housing connecting said upper pressure space to the annular grooves in said housing in a manner to apply fluid pressure to one piston in each annular housing groove in opposition to the application of fluid pressure to the ends of said governor blocks within said upper pressure space, the effective areas of said pistons being less than the effective areas of the ends of said governor blocks by a predetermined amount, gear means in said housing interconnecting said governor blocks for simultaneous and coextensive movement in opposite directions, a fluid pump in said housing, some of the fluid channels in said housing connecting said pump to the annular grooves in said housing in a manner to apply pump pressure to the other piston in each annular groove to balance the difference in effective pressure of the fluid in said upper pressure space on said governor blocks and said pistons to hold said governor blocks in adjusted position and the corresponding chambers against further movement by the effect of fluid pressure on the differential areas of said pistons and said governor blocks, a first adjustable pressure regulating valve connected to the outlet of said pump to maintain a predetermined adjusted pressure at said pump outlet, a cam surface on one of said guide rings controlling said first pressure regulating valve, one of the channels in said housing connecting the outlet of said first pressure regulating valve to said lower pressure space, a second pressure regulating valve connected at its inlet to the outlet of said first pressure regulating valve to maintain a predetermined pressure on the fluid conducted to said lower pressure space and connected at its outlet to the inlet of said pump, and a body of hydraulic fluid in said housing.]

[2. A hydraulic transmission comprising a housing having spaced apart and substantially parallel rotor chambers of cylindrical shape therein, a drive shaft extending eccentrically through one of said chambers and journaled in said housing, a driven shaft extending eccentrically through the other of said chambers and journaled in said housing, rotor bodiies disposed one on each shaft within and eccentric of the corresponding chambers, each of said rotor bodies having its ends spaced from the ends of the corresponding chambers and having longitudinally extending and radially disposed vane slots therein, vanes slidably mounted one in each of said vane slots for movement toward and away from the rotational axis of the corresponding shaft, governor blocks disposed one in each rotor chamber and each having a longitudinally convex outer surface contacting the associated chamber wall and a longitudinally concave inner surface spaced from the peripheral surface of the associated rotor body and engaged by the outer ends of the corresponding vanes as the vanes are moved thereby by rotation of the corresponding rotor body and shaft, said governor blocks being angularly movable in said chambers and toward and away from the peripheral surfaces of the corresponding rotor bodies upon angular movement of the governor blocks to vary the effective vane area of said rotor bodies, guide rings angularly movable in said chambers one at each end of each rotor body and filling the corresponding end portions of said chambers, means connecting each governor block to the guide rings adjacent thereto, each of said guide rings having in its end adjacent the corresponding rotor body a circular groove eccentric of the rotational axis of the rotor body, means movable around said grooves and connected to the adjacent vanes positively moving the vanes inwardly and outwardly of the corresponding rotor bodies as the rotor bodies rotate relative to the guide rings, partition formations disposed in each of said chambers and extending between the corresponding guide rings and from the corresponding chamber wall to the peripheral surface of the associated rotor body at a location spaced from the corresponding governor block and at which the vanes are fully retracted within the peripheral surface of the rotor body, each partition formation dividing the space within the corresponding chamber surrounding the corresponding rotor body into an inlet space and an outlet space and said housing having channels therein one of which connects the outlet space in said one chamber to the inlet space in said other chamber and constitutes an upper pressure space and the other of which connects the inlet space in said one chamber to the outlet space in said other chamber and constitutes a low pressure space, said housing also having a cross channel therein interconnecting said upper and lower pressure spaces to bypass said one chamber, a manually operated valve in said cross channel which when closed constrains hydraulic fluid flowing from the outlet to the inlet of said one chamber to flow from the inlet to the outlet of said other chamber and rotates said other rotor body, said governor blocks being urged by the fluid pressure differential between said upper and lower pressure spaces to move in a direction to decrease the effective vane area of said one rotor body and increase the effective vane area of said other rotor body, and fluid pressure responsive means connected to said guide rings resisting movement of said governor blocks, said housing having relief channels therein in the walls of said chambers and said governor blocks having slots in the rear ends thereof which register with said relief channels when said governor blocks have been moved to predetermined positions in the corresponding chambers to limit the maximum fluid pressure in said chambers to a predetermined value.]

[3. A hydraulic transmission comprising a housing having spaced apart and substantially parallel rotor chambers of cylindrical shape therein, a drive shaft extending eccentrically through one of said chambers and journaled in said housing, a driven shaft extending eccentrically through the other of said chambers and journaled in said housing, rotor bodies disposed one on each shaft within and eccentric of the corresponding chambers, each of said rotor bodies having its ends spaced from the ends of the corresponding chambers and having longitudinally extending and radially disposed vane slots therein, vanes slidably mounted one in each of said vane slots for movement toward and away from the rotational axis of the corresponding shaft, governor blocks disposed one in each rotor chamber and each having a longitudinally convex outer surface contacting the associated chamber wall and a longitudinally concave inner surface spaced from the peripheral surface of the associated rotor body and engaged by the outer ends of the corresponding vanes as the vanes are moved thereby by rotation of the corresponding rotor body and shaft, said governor blocks being angularly movable in said chambers and toward and away from the peripheral surfaces of the corresponding rotor bodies upon angular movement of the governor blocks to vary the effective vane area of said rotor bodies, guide rings angularly movable in said chambers one at each end of each rotor body and filling the corresponding end portions of said chambers, means connecting each governor block to the guide rings adjacent thereto, each of said guide rings having in its end adjacent the corresponding rotor body a circular groove eccentric of the rotational axis of the rotor body, means movable around said grooves and connected to the adjacent vanes positively moving the vanes inwardly and outwardly of the corresponding rotor bodies as the rotor bodies rotate relative to the guide rings, partition formations disposed in each of said chambers and extending between the corresponding guide rings and from the corresponding chamber wall to the peripheral surface of the associated rotor body at a location spaced from the corresponding governor block and at which the vanes are fully retracted within the peripheral surface of the rotor body, each partition formation dividing the space within the corresponding chamber surrounding the corresponding rotor body into an inlet space and an outlet space and said housing having channels therein one of which connects the outlet space in said one chamber to the inlet space in said other chamber and constitutes an upper pressure space and the other of which connects the inlet space in said one chamber to the outlet space in said other chamber and constitutes a low pressure space, said housing also having a cross channel therein interconnecting said upper and lower pressure spaces to bypass said one chamber, a manually operated valve in said cross channel which when closed constrains hydraulic fluid flowing from the outlet to the inlet of said one chamber to flow from the inlet to the outlet of said other chamber and rotates said other rotor body, said governor blocks being urged by the fluid pressure differential between said upper and lower pressure spaces to move in a direction to decrease the effective vane area of said one rotor body and increase the effective vane area of said other rotor body, fluid pressure responsive means connected to said guide rings resisting movement of said governor blocks, and gear means rotationally connecting the guide rings in said one chamber to the guide rings in said other chamber and constraining said governor blocks to move simultaneously and coextensively in respectively opposite directions.]

[4. A hydraulic transmission comprising a housing having spaced apart and substantially parallel rotor chambers of cylindrical shape therein, a drive shaft extending eccentrically through one of said chambers and journaled in said housing, a driven shaft extending eccentrically through the other of said chambers and journaled in said housing, rotor bodies disposed one on each shaft within and eccentric of the corresponding chambers, each of said rotor bodies having its ends spaced from the ends of the corresponding chambers and having longitudinally extending and radially disposed vane slots therein, vanes slidably mounted one in each of said vane slots for movement toward and away from the rotational axis of the corresponding shaft, governor blocks disposed one in each rotor chamber and each having a longitudinally convex outer surface contacting the associated chamber wall and a longitudinally concave inner surface spaced from the peripheral surface of the associated rotor body and engaged by the outer ends of the corresponding vanes as the vanes are moved thereby by rotation of the corresponding rotor body and shaft, said governor blocks being angularly movable in said chambers and toward and away from the peripheral surfaces of the corresponding rotor bodies upon angular movement of the governor blocks to vary the effective vane area of said rotor bodies, guide rings angularly movable in said chambers one at each end of each rotor body and filling the corresponding end portions of said chambers, means connecting each governor block to the guide rings adjacent thereto, each of said guide rings having in its end adjacent the corresponding rotor body a circular groove eccentric of the rotational axis of the rotor body, means movable around said grooves and connected to the adjacent vanes positively moving the vanes inwardly and outwardly of the corresponding rotor bodies as the rotor bodies rotated relative to the guide rings, partition formations disposed in each of said chambers and extending between the corresponding guide rings and from the corresponding chamber wall to the peripheral surface of the associated rotor body at a location spaced from the corresponding governor block and at which the vanes are fully retracted within the peripheral surface of the rotor body, each partition formation dividing the space within the corresponding chamber surrounding the corresponding rotor body into an inlet space and an outlet space and said housing having channels therein one of which connects the outlet space in said one chamber to the inlet space in said other chamber and constitutes an upper pressure space and the other of which connects the inlet space in said one chamber to the outlet space in said other chamber and constitutes a lower pressure space, said housing also having a cross channel therein interconnecting said upper and lower pressure spaces to bypass said one chamber, a manually operated valve in said cross channel which when closed constrains hydraulic fluid flowing from the outlet to the inlet of said one chamber to flow from the inlet to the outlet of said other chamber and rotates said other rotor body, said governor blocks being urged by the fluid pressure differential between said upper and lower pressure spaces to move in a direction to decrease the effective vane area of said one rotor body and increase the effective vane area of said other rotor body, said housing having circular grooves therein one at each end of each chamber concentric with said chambers, stop formations on said housing intercepting each of said housing grooves at spaced apart locations therearound, reaction pistons on each guide ring at spaced apart locations therearound and angularly movable in the adjacent housing grooves each between corresponding adjacent sides of the associated stop formations, and means including fluid passages in said housing supplying hydraulic fluid under pressure to the spaces between said reaction pistons and the corresponding stop formations resisting movement of said governor blocks in response to the fluid pressure differential between said upper and lower pressure spaces.]

[5. A hydraulic transmission comprising a housing having spaced apart and substantially parallel rotor chambers of cylindrical shape therein, a drive shaft extending eccentrically through one of said chambers and journaled in said housing, a driven shaft extending eccentrically through the other of said chambers and journaled in said housing, rotor bodies disposed one on each shaft within and eccentric of the corresponding chambers, each of said rotor bodies having its ends spaced from the ends of the corresponding chambers and having longitudinally extending and radially disposed vane slots therein, vanes slidably mounted one in each of said vane slots for movement toward and away from the rotational axis of the corresponding shaft, governor blocks disposed one in each rotor chamber and each having a longitudinally convex outer surface contacting the associated chamber wall and a longitudinally concave inner surface spaced from the peripheral surface of the associated rotor body and engaged by the outer ends of the corresponding vanes as the vanes are moved thereby by rotation of the corresponding rotor body and shaft, said governor blocks being angularly movable in said chambers and toward and away from the peripheral surfaces of the corresponding rotor bodies upon angular movement of the governor blocks to vary the effective vane area of said rotor bodies, guide rings angularly movable in said chambers one at each end of each rotor body and filling the corresponding end portions of said chambers, means connecting each governor block to the guide rings adjacent thereto, each of said guide rings having in its end adjacent the corresponding rotor body a circular groove eccentric of the rotational axis of the rotor body, means movable around said grooves and connected to the adjacent vanes positively moving the vanes inwardly and outwardly of the corresponding rotor bodies as the rotor bodies rotate relative to the guide rings, partition formations disposed in each of said chambers and extending between the corresponding guide rings and from the corresponding chamber wall to the peripheral surface of the associated rotor body at a location spaced from the corresponding governor block and at which the vanes are fully retracted within the peripheral surface of the rotor body, each partition formation dividing the space within the corresponding chamber surrounding the corresponding rotor body into an inlet space and an outlet space and said housing having channels therein one of which connects the outlet space in said one chamber to the inlet space in said other chamber and constitutes an upper pressure space and the other of which connects the inlet space in said one chamber to the outlet space in said other chamber and constitutes a lower pressure space, said housing also having a cross channel therein interconnecting said upper and lower pressure spaces to bypass said one chamber, a manually operated valve in said cross channel which when closed constrains hydraulic fluid flowing from the outlet to the inlet of said one chamber to flow from the inlet to the outlet of said other chamber and rotates said other rotor body, said governor blocks being urged by the fluid pressure differential between said upper and lower pressure spaces to move in a direction to decrease the effective vane area of said one rotor body and increase the effective vane area of said other rotor body, fluid pressure responsive means connected to said guide rings resisting movement of said governor blocks, a pump driven by said one shaft and having its outlet connected to said lower pressure space to supply hydraulic fluid to the latter, said housing having a drain channel therein connected to the inlet of said pump to return leakage fluid to said pump, and a pressure relief valve connected between said lower pressure space and said drain channel to regulate the pressure of the hydraulic fluid supplied to said lower pressure space by said pump.]

[6. A hydraulic transmission comprising a housing having spaced apart and substantially parallel rotor chambers of cylindrical shape therein, a drive shaft extending eccentrically through one of said chambers and journaled in said housing, a driven shaft extending eccentrically through the other of said chambers and journaled in said housing, rotor bodies disposed one on each shaft within and eccentrically of the corresponding chambers, each of said rotor bodies having its ends spaced from the ends of the corresponding chambers and having longitudinally extending and radially disposed vane slots therein, vanes slidably mounted one in each of said vane slots for movement toward and away from the rotational axis of the corresponding shaft, governor blocks disposed one in each rotor chamber and each having a longitudinally convex outer surface contacting the associated chamber wall and a longitudinally concave inner surface spaced from the peripheral surface of the associated rotor body and engaged by the outer ends of the corresponding vanes as the vanes are moved thereby by rotation of the corresponding rotor body and shaft, said governor blocks being angularly movable in said chambers and toward and away from the peripheral surfaces of the corresponding rotor bodies up angular movement of the governor blocks to vary the effective vane area of said rotor bodies, guide rings angularly movable in said chambers one at each end of each rotor body and filling the corresponding end portions of said chambers, means connecting each governor block to the guide rings adjacent thereto, each of said guide rings having in its end adjacent the corresponding rotor body a circular groove eccentric of the rotational axis of the rotor body, means movable around said grooves and connected to the adjacent vanes positively moving the vanes inwardly and outwardly of the corresponding rotor bodies as the rotor blades rotate relative to the guide rings, partition formations disposed one in each of said chambers and extending between the corresponding guide rings and from the corresponding chamber wall to the peripheral surface of the associated rotor body at a location spaced from the corresponding governor block and at which the vanes are fully retracted within the peripheral surface of the rotor body, each partition formation dividing the space within the corresponding chamber surrounding the corresponding rotor body into an inlet space and an outlet space and said housing having channels therein one of which connects the outlets space in said one chamber to the inlet space in said other chamber and constitutes an upper pressure space and the other of which connects the inlet space in said one chamber to the outlet space in said other chamber and constitutes a lower pressure space, said housing also having a cross channel therein interconnecting said upper and lower pressure spaces to bypass said one chamber, a manually operated valve in said cross channel which when closed constrains hydraulic fluid flowing from the outlet to the inlet of said one chamber to flow from the inlet to the outlet of said other chamber and rotate said other rotor body, said governor blocks being urged by the fluid pressure differential between said upper and lower pressure spaces to move in a direction to decrease the effective vane area of said driving rotor body and increase the effective vane area of said driven rotor body, said housing having channels therein connecting said upper pressure space to each housing groove between one piston and one stop formation in each groove to apply the fluid pressure in said upper presure space to the reaction pistons in a manner to resist movement of the corresponding governor blocks in response to the fluid pressure differential between said upper and lower pressure spaces, the combined areas of the reaction pistons in each chamber subjected to fluid pressure from said upper pressure space being less than the effective end area of the corresponding governor block to provide a residual force tending to move the governor block, a pump driven by said one shaft and connected at its outlet to said housing grooves to apply fluid pressure to the space in each groove between the other reaction piston and the other stop formation therein to counteract said residual force, a first pressure relief valve having an outlet and an inlet and connected at its inlet to the outlet of said pump to regulate the fluid pressure applied by said pump to said housing grooves, a cam surface on one of said guide rings, and means interposed between said cam surface and said first pressure relief valve to adjust said first pressure relief valve to provide fluid pressures which correspond to the angular positions of said governor blocks in said chambers and exactly counteract the residual governor block moving force at each angular position of the governor blocks.]

[7. A hydraulic transmission comprising a housing having spaced apart and substantially parallel rotor chambers of cylindrical shape therein, a drive shaft extending eccentrically through one of said chambers and journaled in said housing, a driven shaft extending eccentrically through the other of said chambers and journaled in said housing, rotor bodies disposed one on each shaft within and eccentrically of the corresponding chambers, each of said rotor bodies having its ends spaced from the ends of the corresponding chambers and having longitudinally extending and radially disposed vane slots therein, vanes slidably mounted one in each of said vane slots for movement toward and away from the rotational axis of the corresponding shaft, governor blocks disposed one in each rotor chamber and each having a longitudinally convex outer surface contacting the associated chamber wall and a longitudinally concave inner surface spaced from the peripheral surface of the associated rotor body and engaged by the outer ends of the corresponding vanes as the vanes are moved thereby by rotation of the corresponding rotor body and shaft, said governor blocks being angularly movable in said chambers and toward and away from the peripheral surfaces of the corresponding rotor bodies upon angular movement of the governor blocks to vary the effective vane area of said rotor bodies, guide rings angularly movable in said chambers one at each end of each rotor body and filling the corresponding end portions of said chambers, means connecting each governor block to the guide rings adjacent thereto, each of said guide rings having in its end adjacent the corresponding rotor body a circular groove eccentric of the rotational axis of the rotor body, means movable around said grooves and connected to the adjacent vanes positively moving the vanes inwardly and outwardly of the corresponding rotor bodies as the rotor bodies rotate relative to the guide rings, partition formations disposed one in each of said chambers and extending between the corresponding guide rings and from the corresponding chamber wall to the peripheral surface of the associated rotor body at a location spaced from the corresponding governor block and at which the vanes are fully retracted within the peripheral surface of the rotor body, each partition formation dividing the space within the corresponding chamber surrounding the corresponding rotor body into an inlet space and an outlet space and said housing having channels therein one of which connects the outlet space in said one chamber to the inlet space in said other chamber and constitutes an upper pressure space and the other of which connects the inlet space in said one chamber to the outlet space in said other chamber and constitutes a lower pressure space, said housing also having a cross channel therein interconnecting said upper and lower pressure spaces to bypass said one chamber, a manually operated valve in said cross channel which when closed constrains hydraulic fluid flowing from the outlet to the inlet of said one chamber to flow from the inlet to the outlet of said other chamber and rotate said other rotor body, said governor blocks being urged by the fluid pressure differential between said upper and lower pressure spaces to move in a direction to decrease the effective vane area of said driving rotor body and increase the effective vane area of said driven rotor body, said housing having channels therein connecting said upper pressure space to each housing groove between one piston and one stop formation in each groove to apply the fluid pressure in said upper pressure space to the reaction pistons in a manner to resist movement of the corresponding governor blocks in response to the fluid pressure differential between said upper and lower pressure spaces, the combined areas of the reaction pistons in each chamber subjected to fluid pressure from said upper pressure space being less than the effective end area of the corresponding governor block to provide a residual force tending to move the governor block, a pump driven by said one shaft and connected at its outlet to said housing grooves to apply fluid pressure to the space in each groove between the other reaction piston and the other stop formation therein to counteract said residual force, a first pressure relief valve having an outlet and an inlet and connected at its inlet to the outlet of said pump to regulate the fluid pressure applied by said pump to said housing grooves, a cam surface on one of said guide rings, means interposed between said cam surface and said first pressure relief valve to adjust said first pressure relief valve to provide fluid pressures which correspond to the angular positions of said governor blocks in said chambers and exactly counteract the residual governor block moving force at each angular position of the governor blocks, and a second pressure relief valve having its inlet connected to the outlet of said first pressure relief valve and its outlet conected to the inlet of said pump, said housing having fluid channels therein connecting the outlet of said first pressure relief valve to said lower pressure space and to one space in each housing groove other than the groove space connected to said upper pressure space and the groove space connected to the outlet of said pump and connecting the remaining space in each housing groove to said lower pressure space.]

[8. A hydraulic transmission comprising a housing having spaced apart and substantially parallel rotor chambers of cylindrical shape therein, a driving shaft extending eccentrically through one of said chambers and journaled in said housing, a driven shaft extending eccentrically through the other of said chambers and journaled in said housing, rotor bodies disposed one on each shaft within and eccentrically of the corresponding chambers, each of said rotor bodies having its end spaced from the ends of the corresponding chambers and having longitudinally extending and radially disposed vane slots therein, vanes slidably mounted one in each of said vane slots for movement toward and away from the rotational axis of the corresponding shaft, governor blocks disposed one in each rotor chamber and each having a longitudinally convex outer surface contacting the associated chamber wall and a longitudinally concave inner surface spaced from the peripheral surface of the associated rotor body and engaged by the outer ends of the corresponding vanes as the vanes are moved thereby by rotation of the corresponding rotor body and shaft, said governor blocks being angularly movable in said chambers and toward and away from the peripheral surfaces of the corresponding rotor bodies upon angular movement of the governor blocks to vary the effective vane area of said rotor bodies, guide rings angularly movable in said chambers one at each end of each rotor body and filling the corresponding end portions of said chambers, means connecting each governor block to the guide rings adjacent thereto, each of said guide rings having in its end adjacent the corresponding rotor body a circular groove eccentric of the rotational axis of the rotor body, means movable around said grooves and connected to the adjacent vanes positively moving the vanes inwardly and outwardly of the corresponding rotor bodies as the rotor bodies rotate relative to the guide rings, partition formations disposed one in each of said chambers and extending between the corresponding guide rings and from the corresponding chamber wall to the peripheral surface of the associated rotor body at a location spaced from the corresponding governor block and at which the vanes are fully retracted within the peripheral surface of the rotor body, each partition formation dividing the space within the corresponding chamber surrounding the corresponding rotor body into an inlet space and an outlet space and said housing having channels therein one of which connects the outlet space in said one chamber to the inlet space in said other chamber and constitutes an upper pressure space and the other of which connects the inlet space in said one chamber to the outlet space in said other chamber and constitutes a lower pressure space, said housing also having a cross channel therein interconnecting said upper and lower pressure spaces to bypass said one chamber, a manually operated valve in said cross channel which when closed constrains hydraulic fluid flowing from the outlet to the inlet of said one chamber to flow from the inlet to the outlet of said other chamber and rotate said other rotor body, said governor blocks being urged by the fluid pressure differential between said upper and lower pressure spaces to move in a direction to decrease the effective vane area of said driving rotor body and increase the effective vane area of said driven rotor body, said housing having channels therein connecting said upper pressure space to each housing groove between one piston and one stop formation in each groove to apply the fluid pressure in said upper pressure space to the reaction pistons in a manner to resist movement of the corresponding governor blocks in response to the fluid pressure differential between said upper and lower pressure spaces, the combined areas of the reaction pistons in each chamber subjected to fluid pressure from said upper pressure space being less than the effective end area of the corresponding governor block to provide a residual force tending to move the governor block, a pump driven by said one shaft and connected at its outlet to said housing grooves to apply fluid pressure to the space in each groove between the other reaction piston and the other stop formation therein to counteract said residual force, a first pressure relief valve having an outlet and an inlet and connected at its inlet to the outlet of said pump to regulate the fluid pressure applied by said pump to said housing grooves, a cam surface on one of said guide rings, means interposed between said cam surface and said first pressure relief valve to adjust said first pressure relief valve to provide fluid pressures which correspond to the angular positions of said governor blocks in said chambers and exactly counteract the residual governor block moving force at each angular position of the governor blocks, and a second pressure relief valve having its inlet connected to the outlet of said first pressure relief valve and its outlet connected to the inlet of said pump, said housing having fluid channels therein connecting the outlet of said first pressure relief valve to said lower pressure space and to one space in each housing groove other than the groove space connected to said upper pressure space and the groove space connected to the outlet of said pump and connecting the remaining space in each housing groove to said lower pressure space, a third pressure relief valve having its outlet connected to the inlet of said pump, and a cut-off valve interposed in the connection between the outlet of said first pressure relief valve and said housing grooves and having outlets opened when said cut-off valve is closed leading one to the inlet of said third pressure relief valve and one to the inlet of said pump, said cut-off valve being operated by said cam surface in response to a movement of said governor blocks to their exereme reverse position upon a reversal of the torque transmitted to the transmission and a consequent reversal of the pressure differential in said upper and lower pressure spaces to progressively cut off the fluid pressure of said first pressure relief valve from the corresponding reaction pistons and sequentially connect the ring spaces adjacent these pistons to the inlet of said third pressure relief valve and to pump inlet so that any pressure surge in the housing grooves incident to a restoration of the direction of torque transmission while said cut-off valve is partly closed will be relieved through said third pressure relief valve and the fluid pressure in the spaces in said housing grooves supplied from the pump outlet will be completely relieved when the cut-off valve is fully closed and fluid pressure supplied to said housing grooves from the outlet of said first pressure relief valve will be rendered fully effective to resist movement of said governor blocks in the reverse direction and maintain a substantial transmission of torque through said transmission in the reverse direction.]

[9. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to fluid pressure in said upper pressure space greater than the fluid pressure in said lower pressure space in directions to decrease the effective vane area of said driving rotor and increase the effective vane area of said driven rotor, and fluid pressure operated means connected to said governor block resisting angular movement of said governor blocks in the corresponding rotor chambers.]

[10. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to fluid pressure in said upper pressure space greater than the fluid pressure in said lower pressure space in directions to decrease the effective vane area of said driving rotor and increase the effective vane area of said driven rotor, and fluid pressure operated means connected to said governor blocks resisting angular movement of said governor blocks in the corresponding rotor chambers, each of said vanes having a packing element extending longitudinally of its outer end and engaging the inner surface of the associated governor block, each of said governor blocks comprising a hollow cylindrical body mounted in the corresponding rotor chamber for angular movement therein and having spaced apart slots extending circumferentially partly therearound and said partition formation comprising a plurality of blocks detachably mounted on the chamber providing means and disposed one in each slot in the corresponding governor block, each of said blocks having recesses disposed one in each side thereof, and packing elements disposed one in each such recess and contacting the side wall surfaces of the corresponding slots in the associated governor block.]

[11. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks resisting angular movement of said governor blocks in the corresponding rotor chambers, and means interconnecting said governor blocks for simultaneous and substantially coextensive movement.]

[12. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure differential in said upper and lower pressure chambers to differentially vary the effective vane areas of said driving and driven rotors, and fluid pressure operated means connected to said governor blocks and subjected to pressure from said upper fluid pressure space resisting angular movement of said governor blocks in the corresponding rotor chambers.]

[13. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks and subjected to pressure from said upper fluid pressure space resisting angular movement of said governor blocks in the corresponding rotor chambers, a pump driven by one of said shafts, and a pressure regulating valve connected to the outlet of said pump and to said fluid pressure operated means supplying fluid at regulated pressures to said fluid pressure operated means to assist said upper pressure space pressure in resisting movement of said governor blocks.]

[14. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks and subjected to pressure from said upper fluid pressure space resisting angular movement of said governor blocks in the corresponding rotor chambers, a pump driven by one of said shafts, a pressure regulating valve connected to the outlet of said pump and to said fluid pressure operated means supplying fluid at regulated pressures to said fluid pressure operated means to assist said upper pressure space pressure in resisting movement of said governor blocks, and means adjusting said pressure regulating valve in response to angular positions of said governor blocks in said chambers to apply to said pressure operated means adjusted pump pressure effective to balance the fluid pressure differential acting on said governor blocks at the various angular positions of said governor blocks in the corresponding chambers.]

[15. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks and subjected to pressure from said upper fluid pressure space resisting angular movement of said governor blocks in the corresponding rotor chambers, a pump driven by one of said shafts, a pressure regulating valve connected to the outlet of said pump and to said fluid pressure operated means supplying fluid at regulated pressures to said fluid pressure operated means to assist said upper pressure space pressure in resisting movement of said governor blocks, said pressure regulating valve having an outlet connected to said lower pressure space to supply hydraulic fluid from said pump to said lower pressure space, and a pressure relief valve connected to the outlet of said pressure regulating valve to control the pressure of the hydraulic fluid supplied to said lower pressure space.]

[16. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks and subjected to pressure from said upper fluid pressure space resisting angular movement of said governor blocks in the corresponding rotor chambers, a pump driven by one of said shafts, and a pressure regulating valve connected to the outlet of said pump and to said fluid pressure operated means supplying fluid at regulated pressures to said fluid pressure operated means to assist said upper pressure space pressure in resisting movement of said governor blocks, said pressure regulating valve having an outlet connected to said lower pressure space to supply hydraulic fluid from said pump to said lower pressure space, a pressure relief valve connected to the outlet of said pressure regulating valve to control the pressure of the hydraulic fluid supplied to said lower pressure space, said governor blocks being movable in a direction to increase the effective vane area of said driving rotor and decrease the effective vane area of said driven rotor upon an increase in the pressure in said lower pressure space above the pressure in said upper pressure space incident to a reversal of the direction of transmission of torque through said transmission, and a valve means operated by said governor blocks when moved in response to an increase in pressure in said lower pressure space above the pressure in said upper pressure space to cut off the outlet of said pump from said pressure operated means and connect the part of said pressure operated means supplied with hydraulic fluid from said pump to a drain while maintaining fluid pressure from the outlet of said pressure regulating valve to another part of said fluid pressure operated means to resist movement of said governor blocks in the above described directions.]

[17. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks and subjected to pressure from said upper fluid pressure space resisting angular movement of said governor blocks in the corresponding rotor chambers, a pump driven by one of said shafts, and a pressure regulating valve connected to the outlet of said pump and to said fluid pressure operated means supplying fluid at regulated pressures to said fluid pressure operated means to assist said upper pressure space pressure in resisting movement of said governor blocks, said pressure regulating valve having an outlet connected to said lower pressure space to supply hydraulic fluid from said pump to said lower pressure space, a pressure relief valve connected to the outlet of said pressure regulating valve to control the pressure of the hydraulic fluid supplied to said lower pressure space, said governor blocks being movable in a direction to increase the effective vane area of said driving rotor and decrease the effective vane area of said driven rotor upon an increase in the pressure in said lower pressure space above the pressure in said upper pressure space incident to a reversal of the direction of transmission of torque through said transmission, valve means operated by said governor blocks when moved in response to an increase in pressure in said lower pressure space above the pressure in said upper pressure space to cut off the outlet of said pump from said pressure operated means and connect the part of said pressure operated means supplied with hydraulic fluid from said pump to a drain while maintaining fluid pressure from the outlet of said pressure regulating valve to another part of said fluid pressure operated means to resist movement of said governor blocks in the above described directions, and a fluid pressure operated valve connected between said upper pressure space and the outlet of said pressure relief valve and closed to preclude leakage of hydraulic fluid from said upper pressure space through said pressure relief valve while the pressure in said upper pressure space is above the pressure provided by said pressure relief valve, said pressure operated valve being opened when the pressure in said upper pressure space falls below the pressure provided by said pressure relief valve upon a reversal of the direction of the transmission of torque through said transmission to connect the inlet of said pressure relief valve to said upper pressure space for supplying hydraulic fluid at the pressure provided by said pressure relief valve to said upper pressure space.]

[18. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks and subjected to pressure from said upper fluid pressure space resisting angular movement of said governor blocks in the corresponding rotor chambers, a pump driven by one of said shafts, and a pressure regulating valve connected to the outlet of said pump and to said fluid pressure operated means supplying fluid at regulated pressures to said fluid pressure operated means to assist said upper pressure space pressure in resisting movement of said governor blocks, said pressure regulating valve having an outlet connected to said lower pressure space to supply hydraulic fluid from said pump to said lower pressure space, a pressure relief valve connected to the outlet of said pressure regulating valve to control the pressure of the hydraulic fluid applied to said lower pressure space, said governor blocks being movable in a direction to increase the effective vane area of said driving rotor and decrease the effective vane area of said driven rotor upon an increase in the pressure in said lower pressure space above the pressure in said upper pressure space incident to a reversal of the direction of transmission of torque through said transmission, valve means operated by said governor blocks when moved in response to an increase in pressure in said lower pressure space above the pressure in said upper pressure space to cut off the outlet of said pump from said pressure operated means and connect the part of said pressure operated means supplied with hydraulic fluid from said pump to a drain while maintaining fluid pressure from the outlet of said pressure regulating valve to another part of said fluid pressure operated means to resist movement of said governor blocks in the above described directions, and a fluid pressure actuated valve connected between said lower pressure chamber and the outlet of said pressure relief valve and open when the pressure in said lower pressure chamber is below the pressure provided by said pressure relieved valve to provide a supply of hydraulic fluid at the pressure provided by said pressure relief valve to said lower fluid pressure space, said fluid pressure actuated valve being closed when the pressure in said lower fluid pressure space exceeds the pressure provided by said pressure relief valve to preclude loss of hydraulic fluid from said lower pressure space through said pressure relief valve.]

[19. A hydraulic transmission comprising a driving unit and a driven unit each including means providing a cylindrical chamber, shafts extending eccentrically one through each of said chambers, rotor bodies having vane slots therein disposed one on each of said shafts within the corresponding chambers and rotatable in the latter, vanes slidably mounted one in each vane slot of said rotors, means in each of said chambers connected to said vanes positively moving said vanes inwardly and outwardly of the vane slots as the corresponding rotor bodies rotate, governor blocks disposed one in each of said chambers in spaced relationship to the corresponding rotor bodies and each having adjacent the corresponding rotor body a curved surface contacted by the outer ends of the adjacent vanes, and a partition formation extending from the wall of each of said chambers to the corresponding rotor body at a location spaced from the associated governor block, the corresponding partition formation providing an inlet space and an outlet space in each of said chambers, means providing channels one connecting the outlet space of the chamber of said driving unit to the inlet space of the chamber of said driven unit and providing an upper pressure space and the other connecting the outlet space of the chamber of said driven unit to the inlet space of the chamber of said driving unit and providing a lower pressure space, said governor blocks being angularly movable in the corresponding chambers in response to a fluid pressure in said upper pressure space greater than the fluid pressure in said lower pressure space in directions to decrease the effective vane area of said driving rotor and increase the effective vane area of said driven rotor, fluid pressure operated means connected to said governor blocks and subjected to pressure from said upper fluid pressure space resisting angular movement of said governor blocks in the corresponding rotor chambers, a pump driven by one of said shafts, and a pressure regulating valve connected to the outlet of said pump and to said fluid pressure operated means supplying fluid at regulated pressures to said fluid pressure operated means to assist said upper pressure space pressure in resisting movement of said governor blocks, said pressure regulating valve having an outlet connected to said lower pressure space to supply hydraulic fluid from said pump to said lower pressure space, a pressure relief valve connected to the outlet of said pressure regulating valve to control the pressure of the hydraulic fluid supplied to said lower pressure space, said governor blocks being movable in a direction to increase the effective vane area of said driving rotor and decrease the effective vane area of said driven rotor upon an increase in the pressure in said lower pressure space above the pressure in said upper pressure space incident to a reversal of the direction of transmission of torque through said transmission, valve means operated by said governor blocks when moved in response to an increase in pressure in said lower pressure space above the pressure in said upper pressure space to cut off the outlet of said pump from said pressure operated means and connect the part of said pressure operated means supplied with hydraulic fluid from said pump to a drain while maintaining fluid pressure from the outlet of said pressure regulating valve to another part of said fluid pressure operated means to resist movement of said governor blocks in the above described directions, a first fluid pressure actuated valve connected between said upper fluid pressure space and said pressure relief valve and closed when the fluid pressure in said upper space exceeds the pressure provided by said pressure relief valve to preclude loss of fluid from said upper space through said pressure relief valve, and a second fluid pressure operated valve connected between said lower fluid pressure space and said pressure relief valve and open when the fluid pressure in said lower space is below the pressure provided by said pressure relief valve to provide a supply of hydraulic fluid at the pressure provided by said pressure relief valve to said lower space, said first fluid pressure actuated valve being opened and said second fluid pressure actuated valve being closed when the fluid pressure in said upper space falls below and the fluid pressure in said lower space rises above the pressure provided by said pressure relief valve incident to a reversal of the direction of the transmission of torque through said transmission to provide a supply of hydraulic fluid at the pressure provided by said pressure relief valve to said upper space and preclude loss of hydraulic fluid from said lower space through said pressure relief valve to thereby maintain a transmission of substantial torque from said driven rotor to said driving rotor under conditions of torque reversal through said transmission.]

*20. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, and an element in said chamber providing governing means, said element partly surrounding said rotor and movable relative to said rotor in opposite directions about said rotor, means responsive to movement of said element in the direction of rotation of said rotor to shift said element in a direction away from the axis of rotation of said rotor and responsive to movement of said element in the opposite direction about said rotor to shift said element toward the axis of rotation of said rotor to approximately engage vane portions remote from the rotational axis of said rotor at different angular positions where said vanes are at more or less distance from the rotational axis of said rotor, thereby to substantially vary both the effective vane area of said rotor and the volume of fluid moving about said rotor, said element having surface exposed to the rotor inlet passage fluid pressure tending to move said element angularly in one direction about said rotor, and said element also having surface exposed to said rotor outlet passage fluid pressure tending to move the said element angularly in the opposite direction.*

*21. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, a hollow element at least partly surrounding said rotor and having at least one slot therethrough extending partially around said element, said element being movable in opposite directions about said rotor and having a portion providing governing means movable away from the axis of rotation of said rotor upon movement of said element in the direction of rotation of said rotor and movable toward the axis of rotation of said rotor upon movement of the element in the opposite direction about said rotor to approximately engage vane portions which are remote from the rotational axis of said rotor at different angular positions where said vanes are at more or less distance from the rotational axis of said rotor, thereby to substantially vary both the effective vane area of said rotor and the volume of fluid moving about said rotor, said element having surface exposed to the rotor inlet passage fluid pressure tending to move the said element angularly in one direction, and said element also having surface exposed to the rotor outlet passage fluid pressure tending to move the said element angularly in the opposite direction.*

*22. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, governing means movable in opposite directions about said rotor, means responsive to movement of said governing means in the direction of rotation of said rotor to shift said governing means in a direction away from the axis of rotation of said rotor and responsive to movement of said governing means in the opposite direction about said rotor to shift said governing means in a direction toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor.*

*23. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, governing means movable in opposite directions about said rotor, means responsive to movement of said governing means in the direction of rotation of said rotor to shift said governing means in a direction away from the axis of rotation of said rotor and responsive to movement of said governing means in the opposite direction about said rotor to shift said governing means in a direction toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor, and means for bypassing fluid directly between said rotor inlet and outlet passages in response to movement of said governing means to a predetermined angular position.*

*24. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, governing means movable in opposite directions about said rotor, means responsive to movement of said governing means in the direction of rotation of said rotor to shift said governing means in a direction away from the axis of rotation of said rotor and responsive to movement of said governing means in the opposite direction about said rotor to shift said governing means in a direction toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor, and means including fluid pressure actuated means operatively connected to said governing means to control the movement of said governing means.*

*25. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, governing means movable in opposite directions about said rotor, means responsive to movement of said governing means in the direction of rotation of said rotor to shift said governing means in a direction away from the axis of rotation of said rotor and responsive to movement of said governing means in the opposite direction about said rotor to shift said governing means in a direction toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor, and means including fluid pressure actuated means operatively connected to said governing means to regulate the angular movement of said governing means and to limit the angular movement of said governing means.*

26. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, means providing a bypass passage connecting said inlet and outlet passages together, and a valve in said bypass passage operable to connect and disconnect said inlet and outlet passages, governing means movable in opposite directions about said rotor, means responsive to movement of said governing means in the direction of rotation of said rotor to shift said governing means in a direction away from the axis of rotation of said rotor and responsive to movement of said governing means in the opposite direction about said rotor to shift said governing means in a direction toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor.

27. In a fluid translating device, means providing a chamber, a rotor disposed for rotation within said chamber and having vanes movable toward and away from the rotational axis of said rotor in response to rotation of said rotor, means responsive to rotation of the rotor and operatively connected to said vanes for positively controlling movement of said vanes toward and away from the rotational axis of the said rotor, means in the said chamber providing a rotor inlet passage, and means in the said chamber providing a rotor outlet passage spaced circumferentially from the said rotor inlet passage, governing means movable in opposite directions about said rotor, means responsive to movement of said governing means in the direction of rotation of said rotor to shift said governing means in a direction away from the axis of rotation of said rotor and responsive to movement of said governing means in the opposite direction about said rotor to shift said governing means in a direction toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor.

28. In a fluid translating device, means providing a chamber, a rotor disposed for rotation within said chamber and having vanes movable toward and away from the rotational axis of said rotor in response to rotation of said rotor, means responsive to rotation of the rotor and operatively connected to said vanes for positively controlling movement of said vanes toward and away from the rotational axis of the said rotor, means in the said chamber providing a rotor inlet passage, and means in the said chamber providing a rotor outlet passage spaced circumferentially from the said rotor inlet passage, means providing a bypass passage connecting said inlet and outlet passages together, and a valve in said bypass passage operable to connect and disconnect said inlet and outlet passages, governing means movable in opposite directions about said rotor, means responsive to movement of said governing means in the direction of rotation of said rotor to shift said governing means in a direction away from the axis of rotation of said rotor and responsive to movement of said governing means in the opposite direction about said rotor to shift said governing means in a direction toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor, means for bypassing fluid directly between said rotor inlet and outlet passages in response to movement of said governing means to a predetermined angular position, and means including fluid pressure actuated means operatively connected to said governing means to control the movement of said governing means.

29. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, an element in said chamber providing governing means and movable relative to said rotor in opposite directions about the latter, means responsive to movement of said element in the direction of rotation of said rotor to shift said element in one direction radially with respect to the rotor axis and responsive to movement of said element in the opposite direction about said rotor to shift said element in the opposite radial direction to approximately engage vane portions remote from the rotational axis of said rotor at different angular positions where said vanes are at more or less distance from the rotational axis of said rotor, thereby to substantially vary both the effective vane area of said rotor and the volume of fluid moving about said rotor, said element having surface exposed to the rotor inlet passage pressure tending to move said element in the direction of rotation thereof and having surface exposed to the rotor outlet passage pressure tending to move said element in the direction opposite rotor rotation, fluid pressure operated means for resisting movement of said element in one direction about the rotor, and control means responsive to movement of said element in the latter direction for progressively increasing the resistance of said fluid pressure operated means to movement of said element in said latter direction.

30. In a fluid translating device, means providing a chamber, a rotor disposed for rotation within said chamber and having vanes movable toward and away from the rotational axis of said rotor in response to rotation of said rotor, means in the said chamber providing a rotor inlet passage, and means in the said chamber providing a rotor outlet passage spaced circumferentially from the said rotor inlet passage, governing means movable in opposite directions about said rotor, means responsive to movement of said governing means in one direction about said rotor to shift said governing means in a direction away from the axis of rotation of said rotor and responsive to movement of said governing means in the opposite direction about said rotor to shift said governing means toward the axis of rotation of said rotor to approximately engage vane portions remote from the rotational axis of said rotor at different angular positions where said vanes are at more or less distance from the rotational axis of the rotor, thereby to substantially vary both the effective vane area of said rotor and the volume of fluid moving about said rotor, and means for bypassing fluid directly between said rotor inlet and outlet passages in response to movement of said governing means to a predetermined angular position.

31. In a hydraulic transmission, a drive assembly and a driven assembly, each of the said assemblies including means providing a chamber, a rotor disposed for rotation within each chamber and having vanes movable toward and away from the rotational axis of said rotor in response to rotation of the latter, means in each chamber providing a rotor inlet passage, and means in each chamber providing a rotor outlet passage spaced from said inlet passage, means connecting the inlet passages of each chamber with the outlet passage of the other chamber, governing means for said drive and driven assemblies respectively movable in opposite directions about the associated rotors, means responsive to movement of said governing means in the direction of rotation of the associated rotors to shift said governing means in a direction away from the axes of rotation of the associated rotors and responsive to movement of said governing means in the opposite direction about the associated rotors to shift said governing means in a direction toward the axes of rotation of the associated rotors to approximately engage vane portions remote from the rotational axes of said rotors at different angular positions where said vanes are at more or less distance from the rotational axes of said rotors, thereby to substantially vary both the effective vane areas of said rotors and the volume of fluid moving about said rotors, and means interconnecting said governing means for angular movement together to increase the effective vane area of one of said rotors and simultaneously decrease the effective vane area of the other of said rotors, and to decrease the effective vane area of the said one of said rotors and simultaneously increase the effective vane area of the said other of said rotors.

32. In a hydraulic transmission, a drive assembly and a driven assembly, each of the said assemblies including means providing a chamber, a rotor disposed for rotation within each chamber and having vanes movable toward and away from the rotational axis of said rotor in response to rotation of the latter, means in each chamber providing a rotor inlet passage, and means in each chamber providing a rotor outlet passage spaced from said inlet passage, means connecting the inlet passages of each chamber with the outlet passage of the other chamber, governing means for said drive and driven assemblies respectively movable in opposite directions about the associated rotors, means responsive to movement of said governing means in the direction of rotation of the associated rotors to shift said governing means in one direction radially with respect to the axes of rotation of the associated rotors and responsive to movement of said governing means in the opposite direction about the associated rotors to shift said governing means in the opposite radial direction with respect to the axes of the associated rotors to approximately engage vane portions remote from the rotational axes of said rotors at different angular positions where said vanes are at more or less distance from the rotational axes of said rotors, thereby to substantially vary both the effective vane areas of said rotors and the volume of fluid moving about said rotors, and means interconnecting said governing means for angular movement together to increase the effective vane area of one of said rotors and simultaneously decrease the effective vane area of the other of said rotors, and to decrease the effective vane area of the said one of said rotors and simultaneously increase the effective vane area of the said other of said rotors.

33. In a hydraulic transmission, a drive assembly and a driven assembly, each of the said assemblies including means providing a chamber, a rotor disposed for rotation within each chamber and having vanes movable toward and away from the rotational axis of said rotor in response to rotation of the latter, means in each chamber providing a rotor inlet passage, and means in each chamber providing a rotor outlet passage spaced from said inlet passage, means connecting the inlet passages of each chamber with the outlet passage of the other chamber, governing means for said drive and driven assemblies respectively movable in opposite directions about the associated rotors, means responsive to movement of said governing means in the direction of rotation of the associated rotors to shift said governing means in a direction away from the axes of rotation of the associated rotors and responsive to movement of said governing means in the opposite direction about the associated rotors to shift said governing means in a direction toward the axes of rotation of the associated rotors to approximately engage vane portions remote from the rotational axes of said rotors at different angular positions where said vanes are at more or less distance from the rotational axes of said rotors, thereby to substantially vary both the effective vane areas of said rotors and the volume of fluid moving about said rotors, means interconnecting said governing means for angular movement together to increase the effective vane area of one of said rotors and simultaneously decrease the effective vane area of the other of said rotors, and to decrease the effective vane area of the said one of said rotors and simultaneously increase the effective vane area of the said other of said rotors, means including fluid seals for substantially reducing fluid leakage throughout the transmission, and means comprising fluid seals, drain passages and a fluid reservoir preventing fluid leakage from the transmission, a pump, a passage connecting the said fluid reservoir to the inlet of the pump, and means including valve controlled passages for supplying fluid at predetermined pressures from the outlet of the said pump to the said rotor inlet and outlet passages to maintain an ample supply of fluid in the said rotor inlet and outlet passages and to hasten the filling of those portions of the said rotor inlet passages which lie between the rotor vanes.

34. In a hydraulic transmission, a drive assembly and a driven assembly, each of the said assemblies including means providing a chamber, a rotor disposed for rotation within each chamber and having vanes movable toward and away from the rotational axis of said rotor in response to rotation of the latter, means in each chamber providing a rotor inlet passage, and means in each chamber providing a rotor outlet passage spaced from said inlet passage, means connecting the inlet passages of each chamber with the outlet passage of the other chamber, governing means for said drive and driven assemblies respectively movable in opposite directions about the associated rotors, means responsive to movement of said governing means in the direction of rotation of the associated rotors to shift said governing means in a direction away from the axes of rotation of the associated rotors and responsive to movement of said governing means in the opposite direction about the associated rotors to shift said governing means in a direction toward the axes of rotation of the associated rotors to approximately engage vane portions remote from the rotational axes of said rotors at different angular positions where said vanes are at more or less distance from the rotational axes of said rotors, thereby to substantially vary both the effective vane areas of said rotors and the volume of fluid moving about said rotors, means interconnecting said governing means for angular movement together to increase the effective vane area of one of said rotors and simultaneously decrease the effective vane area of the other of said rotors, and to decrease the effective vane area of the said one of said rotors and simultaneously increase the effective vane area of the said other of said rotors, and means which include fluid pressure actuated means operatively connected to said governing means and responsive to movement of the drive assembly by the driven assembly for actuating the governing means to establish a predetermined fixed driving ratio between the effective vane area of the driven assembly and the effective vane area of the drive assembly.

35. In a hydraulic transmission, a drive assembly and a driven assembly, each of the said assemblies including means providing a chamber, a rotor disposed for rotation within each chamber and having vanes movable toward and away from the rotational axis of said rotor in response to rotation of the latter, means in each chamber providing a rotor inlet passage, and means in each chamber providing a rotor outlet passage spaced from said inlet passage, means connecting the inlet passages of each chamber with the outlet passage of the other chamber,

*governing means for said drive and driven assemblies respectively movable in opposite directions about the associated rotors, means responsive to movement of said governing means in the direction of rotation of the associated rotors to shift said governing means in a direction away from the axes of rotation of the associated rotors and responsive to movement of said governing means in the opposite direction about the associated rotors to shift said governing means in a direction toward the axes of rotation of the associated rotors to approximately engage vane portions remote from the rotational axes of said rotors at different angular positions where said vanes are at more or less distance from the rotational axes of said rotors, thereby to substantially vary both the effective vane areas of said rotors and the volume of fluid moving about said rotors, means interconnecting said governing means for angular movement together to increase the effective vane area of one of said rotors and simultaneously decrease the effective vane area of the other of said rotors, and to decrease the effective vane area of the said one of said rotors and simultaneously increase the effective vane area of the said other of said rotors, means which include fluid pressure actuated means operatively connected to said governing means and responsive to movement of the drive assembly by the driven assembly for actuating the governing means to establish a predetermined fixed driving ratio between the effective vane area of the driven assembly and the effective vane area of the drive assembly, means including fluid seals for substantially reducing fluid leakage throughout the transmission, and means comprising fluid seals, drain passages and a fluid reservoir preventing fluid leakage from the transmission, a pump, a passage connecting the said fluid reservoir to the inlet of the pump, and means including valve controlled passages for supplying fluid at predetermined pressures from the outlet of the said pump to the said rotor inlet and outlet passages to maintain an ample supply of fluid in the said rotor inlet and outlet passages and to hasten the filling of those portions of the said rotor inlet passages which lie between the rotor vanes.*

*36. In a hydraulic transmission, a drive assembly and a driven assembly, each of the said assemblies including means providing a chamber, a rotor disposed for rotation within each chamber and having vanes movable toward and away from the rotational axis of said rotor in response to rotation of the latter, means in each chamber providing a rotor inlet passage, and means in each chamber providing a rotor outlet passage spaced from said inlet passage, means connecting the inlet passages of each chamber with the outlet passage of the other chamber, elements providing governing means for said drive and driven assemblies respectively movable in opposite directions about the associated rotors, means responsive to movement of said elements in the direction of rotation of the associated rotors to shift said elements in one direction radially with respect to the associated rotor axes and responsive to movement of said elements in the opposite direction about the associated rotors to shift said elements in the opposite radial direction with respect to the axes of rotation of the associated rotors to approximately engage vane portions remote from the rotational axes of said rotors at different angular positions where said vanes are at more or less distance from the rotational axes of said rotors, thereby to substantially vary both the effective vane areas of said rotors and the volume of fluid moving about said rotors, said elements having surfaces exposed to the associated inlet passage pressure tending to move said elements in the direction of rotation of the associated rotor and having surfaces exposed to the associated rotor outlet passage pressure tending to move said elements in the direction opposite rotor rotation, means interconnecting said governing means for angular movement together to increase the effective vane area of one of said rotors and simultaneously decrease the effective vane area of the other of said rotors, and to decrease the effective vane area of the said one of said rotors and simultaneously increase the effective vane area of the said other of said rotors, fluid pressure operated means for resisting movement of the element associated with said drive assembly in the direction opposite rotation of the associated rotor and for resisting movement of the element associated with said driven assembly in the direction of rotation of the associated rotor, and control means responsive to movement of the element associated with said drive assembly in the direction opposite rotation of the associated rotor for progressively increasing the resistance of said fluid pressure operated means to such movement.*

References Cited in the file of this patent or the original patent

UNITED STATES PATENTS

| | | |
|---|---|---|
| 2,062,310 | Hittell | Dec. 1, 1936 |
| 2,161,439 | Thoma | June 6, 1939 |
| 2,381,795 | Willett | Aug. 7, 1945 |
| 2,385,069 | Ferris | Sept. 18, 1945 |
| 2,420,155 | Tucker | May 6, 1947 |
| 2,426,491 | Dillon | Aug. 26, 1947 |
| 2,564,237 | Segsworth | Aug. 14, 1951 |
| 2,592,247 | Coe | Apr. 8, 1952 |